United States Patent
Ning et al.

(10) Patent No.: US 11,288,835 B2
(45) Date of Patent: Mar. 29, 2022

(54) LIGHTTRACK: SYSTEM AND METHOD FOR ONLINE TOP-DOWN HUMAN POSE TRACKING

(71) Applicants: Beijing Jingdong Shangke Information Technology Co., Ltd., Beijing (CN); JD.com American Technologies Corporation, Mountain View, CA (US)

(72) Inventors: Guanghan Ning, Sunnyvalet, CA (US); Harry Huang, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 216 days.

(21) Appl. No.: 16/576,856

(22) Filed: Sep. 20, 2019

(65) Prior Publication Data

US 2021/0090284 A1 Mar. 25, 2021

(51) Int. Cl.
*G06T 7/00* (2017.01)
*G06T 7/73* (2017.01)
*G06K 9/00* (2022.01)

(52) U.S. Cl.
CPC ............ *G06T 7/73* (2017.01); *G06K 9/00362* (2013.01); *G06T 2207/10016* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| 9,946,960 B1 | 4/2018 | Kim et al. |
| 2007/0122001 A1* | 5/2007 | Wang ................. G06K 9/00208 382/103 |

(Continued)

FOREIGN PATENT DOCUMENTS

| CN | 110163286 A | * | 8/2019 |
| CN | 110163286 A | | 8/2019 |

OTHER PUBLICATIONS

Law, H and Deng, J, CornerNet: Detecting objects as paired keypoints, 2019, arXiv:1808.01244.

(Continued)

*Primary Examiner* — Delomia L Gilliard
(74) *Attorney, Agent, or Firm* — China Science Patent & Trademark US LLC; Shanyun Lu

(57) ABSTRACT

A system and a method for pose tracking, particularly for top-down, online, multi-person pose tracking. The system includes a computing device having a processor and a storage device storing computer executable code. The computer executable code, when executed at the processor, is configured to: provide a plurality of sequential frames of a video, the sequential frames comprising at least one keyframe and a plurality of non-keyframes; for each of the non-keyframes: receive a previous inference bounding box of an object inferred from a previous frame; estimate keypoints from the non-keyframe in an area defined by the previous inference bounding box to obtain estimated keypoints; determine object state based on the estimated keypoints, wherein the object state comprise a "tracked" state and a "lost" state; and when the object state is "tracked," infer an inference bounding box based on the estimated keypoints to process a frame next to the non-keyframe.

17 Claims, 9 Drawing Sheets

(56) References Cited

U.S. PATENT DOCUMENTS

| | | | |
|---|---|---|---|
| 2014/0363048 A1* | 12/2014 | Vrcelj | G06K 9/6228 |
| | | | 382/103 |
| 2016/0267325 A1* | 9/2016 | Sundaresan | G06K 9/00624 |
| 2017/0286774 A1* | 10/2017 | Gaidon | G06K 9/00805 |
| 2019/0026538 A1* | 1/2019 | Wang | G06K 9/4642 |
| 2019/0050693 A1* | 2/2019 | Taghavi | G06K 9/00718 |
| 2019/0114804 A1* | 4/2019 | Sundaresan | G06K 9/66 |
| 2019/0213712 A1 | 7/2019 | Shoa Hassani Lashdan et al. | |
| 2019/0219401 A1* | 7/2019 | Daniilidis | G01C 21/18 |
| 2020/0074678 A1* | 3/2020 | Ning | G06K 9/00342 |
| 2020/0097739 A1* | 3/2020 | Hashimoto | B60W 30/0956 |
| 2020/0327465 A1* | 10/2020 | Baek | G06Q 10/0635 |
| 2021/0034856 A1* | 2/2021 | Torres | G06K 9/325 |
| 2021/0042592 A1* | 2/2021 | Hashimoto | G06K 9/685 |

OTHER PUBLICATIONS

Xiao, B; Wu, H and Wei, Y, Simple baselines for human pose estimation and tracking, 2018, arXiv:1804.06208.

Yan, S; Xiong, Y; and Lin D, Spatial temporal graph convolutional networks for skeleton-based action recognition, 2018, arXiv:1801.07455.

Zhu, J; Yang, H, et al., Online multi-object tracking with dual matching attention networks, 2019, arXiv:1902.00749.

The International Search Report and the Written Opinion of the International Searching Authority for PCT/CN2020/116226, dated Dec. 30, 2020.

\* cited by examiner

Table 1

|  | Train | Validation |
|---|---|---|
| Positive Pairs | 56908 | 9731 |
| Hard Negative Pairs | 25064 | 7020 |
| Other Negative Pairs | 241450 | 91228 |

FIG. 8

Table 2

| | Method / Thresh | 0.1 | 0.2 | 0.3 | 0.4 | 0.5 |
|---|---|---|---|---|---|---|
| Prec | Deformable FPN | 17.9 | 27.5 | 32.2 | 34.2 | 35.7 |
| | Deformable R-FCN | 15.4 | 21.1 | 25.9 | 30.3 | 34.5 |
| Recall | Deform FPN | 87.7 | 86.0 | 84.5 | 83.0 | 80.8 |
| | Deform R-FCN | 87.7 | 86.5 | 85.0 | 82.6 | 80.1 |

FIG. 9

Table 3

| - | Estimation (mAP) | | | Tracking (MOTA) | | |
|---|---|---|---|---|---|---|
| Method | Wri | Ankl | Total | Wri | Ankl | Total |
| GT Detections | 74.7 | 75.4 | 81.7 | 56.3 | 56.2 | 67.0 |
| Deform FPN-101 | 70.2 | 64.7 | 74.6 | 54.6 | 48.7 | 61.3 |
| Deform RFCN-101 | 69.0 | 64.3 | 73.7 | 52.2 | 47.4 | 59.0 |

FIG. 10

Table 4

| - | Estimation (mAP) | | | Tracking (MOTA) | | |
|---|---|---|---|---|---|---|
| Method | Wri | Ankl | Total | Wri | Ankl | Total |
| Offline-CPN101 | 72.6 | 68.9 | 76.4 | 56.1 | 55.3 | 62.4 |
| Offline-MSRA152 | 73.6 | 70.5 | 77.3 | 58.5 | 58.5 | 64.9 |
| Online-DET-CPN101-8F | 70.5 | 68.3 | 74.0 | 52.4 | 50.3 | 58.1 |
| Online-DET-CPN101-5F | 71.7 | 68.9 | 75.1 | 53.3 | 51.0 | 59.0 |
| Online-DET-CPN101-2F | 72.4 | 69.1 | 76.0 | 54.2 | 51.5 | 60.0 |
| Online-DET-MSRA152-8F | 71.1 | 69.5 | 75.0 | 54.6 | 54.6 | 61.0 |
| Online-DET-MSRA152-5F | 72.1 | 70.4 | 76.1 | 55.2 | 55.5 | 61.9 |
| Online-DET-MSRA152-2F | 73.3 | 70.9 | 77.2 | 56.5 | 56.6 | 63.3 |

FIG. 11

Table 5

| Method | Detect | Keyframe | MOTA | |
|---|---|---|---|---|
| | | | CPN101 | MSRA152 |
| SC | GT | 8F | 68.2 | 72.0 |
| SC+GCN | | | 68.9 | 72.6 |
| SC | | 5F | 68.7 | 73.0 |
| SC+GCN | | | 69.2 | 73.5 |
| SC | | 2F | 72.0 | 76.7 |
| SC+GCN | | | 73.5 | 78.0 |
| SC | DET | 8F | 58.1 | 61.0 |
| SC+GCN | | | 59.0 | 62.1 |
| SC | | 5F | 59.0 | 61.9 |
| SC+GCN | | | 60.1 | 63.1 |
| SC | | 2F | 60.0 | 63.3 |
| SC+GCN | | | 61.3 | 64.6 |

FIG. 12

Table 6

| | Method | Wrist-AP | Ankles-AP | mAP | MOTA | fps |
|---|---|---|---|---|---|---|
| | Posetrack 2017 Test Set | | | | | |
| Offline | PoseTrack, CVPR'18 | 54.3 | 49.2 | 59.4 | 48.4 | - |
| | BUTD, ICCV'17 | 52.9 | 42.6 | 59.1 | 50.6 | - |
| | Detect-and-track, CVPR'18 | - | - | 59.6 | 51.8 | - |
| | Flowtrack-152, ECCV'18 | 71.5 | 65.7 | 74.6 | 57.8 | - |
| | HRNet, CVPR'19 | 72.0 | 67.0 | 74.9 | 57.9 | - |
| | Ours-CPN101 (offline) | 68.0 / 59.7 | 62.6 / 56.3 | 70.7 / 63.9 | 55.1 | - |
| | Ours-MSRA152 (offline) | 68.9 / 61.8 | 63.2 / 58.4 | 71.5 / 65.7 | 57.0 | - |
| | Ours-manifold (offline) | - / 64.6 | -/58.4 | -/66.7 | 58.0 | - |
| Online | PoseFlow, BMVC'18 | 59.0 | 57.9 | 63.0 | 51.0 | 10* |
| | JointFlow, Arxiv'18 | 53.1 | 50.4 | 63.3 | 53.1 | 0.2 |
| | Ours-CPN101-LightTrack-3F | 61.2 | 57.6 | 63.8 | 52.3 | **47* / 0.8** |
| | Ours-MSRA152-LightTrack-3F | 63.8 | 59.1 | 66.5 | 55.1 | **48* / 0.7** |
| | Posetrack 2018 Validation Set | | | | | |
| | Ours-CPN101 (offline) | 72.6 / 63.9 | 68.9 / 62.6 | 76.4 / 69.7 | 62.4 - | - |
| | Ours-MSRA152 (offline) | 73.6 / 65.6 | 70.5 / 64.9 | 77.3 / 71.2 | 64.9 - | - |
| | Ours-YoloMD-LightTrack-2F | 62.9 / 56.2 | 57.8 / 53.3 | 70.4 / 66.0 | 55.7 | 59* / 1.9 |
| | Ours-CPN101-LightTrack-2F | 72.4 / 66.3 | 69.1 / 64.2 | 76.0 / 70.3 | 61.3 | 47* / 0.8 |
| | Ours-MSRA152-LightTrack-2F | 73.3 / 66.4 | 70.9 / 66.1 | 77.2 / 72.4 | 64.6 | 48* / 0.7 |

FIG. 13

LIGHTTRACK: SYSTEM AND METHOD FOR ONLINE TOP-DOWN HUMAN POSE TRACKING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates generally to human pose tracking, and more specifically related to a generic lightweight framework for online top-down human pose tracking,

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Pose tracking is the task of estimating multi-person human poses in videos and assigning unique instance IDs for each keypoint across frames. Accurate estimation of human keypoint-trajectories is useful for human action recognition, human interaction understanding, motion capture and animation, etc. Recently, the publicly available Pose-Track dataset and MPII Video Pose dataset have pushed the research on human motion analysis one step further to its real-world scenario. Two PoseTrack challenges have been held. However, most existing methods are offline hence lacking the potential to be real-time.

Therefore, an unaddressed need exists in the art to address the aforementioned deficiencies and inadequacies.

SUMMARY OF THE DISCLOSURE

In certain aspects, the present disclosure relates to a system for pose tracking, particularly for a top-down, multi-person, online pose tracking. The system includes a computing device. The computing device has a processor and a storage device storing computer executable code. The computer executable code, when executed at the processor, is configured to:

provide a plurality of sequential frames of a video, the sequential frames comprising at least one keyframe and a plurality of non-keyframes;

for each of the non-keyframes: receive a previous inference bounding box of an object inferred from a previous frame; estimate keypoints from the non-keyframe in an area defined by the previous inference bounding box to obtain estimated keypoints; determine object state based on the estimated keypoints, wherein the object state comprises a "tracked" state and a "lost" state; and when the object state is "tracked," infer an inference bounding box based on the estimated keypoints to process a frame next to the non-keyframe.

In certain embodiments, the computer executable code is configured to estimate keypoints from the non-keyframe using a convolutional neural network.

In certain embodiments, the object state is "tracked" when the estimated keypoints have an average confidence score greater than a threshold score, and the object state is "lost" when the estimated keypoints have the average confidence score equals to or less than the threshold score.

In certain embodiments, the computer executable code is configured to infer the inference bounding box by: defining an enclosing box enclosing the estimated keypoints; and enlarging the enclosing box by 20% along each of a horizontal direction and a vertical direction of the enclosing box.

In certain embodiments, the computer executable code is further configured to, when the object state is "lost": detect objects from the non-keyframe, wherein each of the detected objects is defined by a detected bounding box; estimate keypoints from each of the detected bounding box to obtain detected keypoints; identify teach of the detected objects by comparing the detected keypoints of the detected object against stored keypoints of stored objects, each of the stored objects has an object identification (ID); and assign the detected objects with the object ID of one of the stored objects when the detected keypoints match the stored keypoints from corresponding one of the stored objects.

In certain embodiments, the computer executable code is configured to detect objects using a convolutional neural network. In certain embodiments, the computer executable code is configured to estimate the keypoints using a convolutional neural network.

In certain embodiments, the step of comparing the detected keypoints of the detected object against the stored keypoints is performed using a Siamese graphic convolutional network (SGCN), the SGCN comprises two graph convolutional networks (GCNs) with shared network weight, each of the GCNs comprise: a first graphic convolutional network (GCN) layer; a first Relu Unit connected to the first GCN layer; a second GCN layer connected to the first Relu Unit; a second Relu Unit connected to the second GCN layer; an average pooling layer connected to the second GCN layer; a fully connected network (FCN); and a feature vector converting layer. The first GCN layer is configured to receive detected keypoints of one of the detected objects, and the feature vector converting layer is configured to produce a feature vector representing pose of one of the detected objects.

In certain embodiments, the SGCN is configured to perform the step of comparing by: running estimated keypoints through one of the two GCNs to obtain an estimated feature vector for the estimated keypoints; running stored keypoints of one of the stored objects through the other one of the two GCNs to obtain a feature vector for the stored keypoints; and determining the estimated keypoints and the stored keypoints as match when the estimated feature vector and the stored feature vector has a distance less than a predetermined threshold.

In certain embodiments, for each of the non-keyframes, the computer executable code is configured to, when the estimated keypoints of the object do not match the keypoints of anyone of the stored objects: assign the object with a new object ID.

In certain embodiments, for each of the keyframes, the computer executable code is configured to:

detect objects in the keyframe, wherein each of the detected objects is defined by a bounding box;

estimate a plurality of detected keypoints of each of the detected objects from its corresponding bounding box;

identify each of the detected objects by comparing the detected keypoints of the detected object against stored keypoints of each stored object, each of the stored objects having an object ID; and assign the detected object with the detected keypoints with the object ID from one of the stored objects when the detected keypoints match the stored keypoints from the one of the stored objects.

In certain embodiments, for each of the keyframes, the computer executable code is configured to, when the estimated keypoints of the object do not match the keypoints of anyone of the stored objects: assign the object with a new object ID.

In certain aspects, the present disclosure relates to a method for pose tracking, particularly for a top-down, multi-person, online pose tracking. In certain embodiments, the method includes:

providing a plurality of sequential frames of a video, the sequential frames comprising at least one keyframe and a plurality of non-keyframes;

for each of the non-keyframes:

receiving a previous inference bounding box of an object inferred from a previous frame;

estimating keypoints from the non-keyframe in an area defined by the previous inference bounding box to obtain estimated keypoints;

determining object sate based on the estimated keypoints, wherein the object state comprises a "tracked" state and a "lost" state; and when the object state is "tracked," inferring an inference bounding box based on the estimated keypoints to process a frame next to the non-keyframe.

In certain embodiments, the object state is "tracked" when the estimated keypoints have an average confidence score greater than a threshold score, and the object state is "lost" when the estimated keypoints have the confidence score equals to or less than the threshold score.

In certain embodiments, the step of inferring the inference bounding box includes: defining an enclosing box enclosing the estimated keypoints; and enlarging the enclosing box by 20% along each of a horizontal direction and a vertical direction of the enclosing box.

In certain embodiments, the method further includes, when the object state is "lost":

detecting objects from the non-keyframe, wherein each of the detected objects is defined by a detected bounding box;

estimating keypoints of each detected objects from corresponding one of the detected bounding boxes to obtain detected keypoints;

identifying each detected bounding object by comparing the detected keypoints of the detected object against stored keypoints of each of stored objects, each of the stored objects has an object identification (ID); and assigning the detected object with the object ID of one of the stored objects when the detected keypoints match the stored keypoints of the one of the stored objects.

In certain embodiments, each of the step of detecting objects and the step of estimating keypoints is performed using a convolutional neural network (CNN).

In certain embodiments, the step of comparing the detected keypoints of the detected objects against the store keypoints is performed using a Siamese graphic convolutional network (SGCN), the SGCN comprises two graph convolutional networks (GCNs) with shared network weight, each of the GCNs comprise: a first graphic convolutional network (GCN) layer; a first Relu Unit connected to the first GCN layer; a second GCN layer connected to the first Relu Unit; a second Relu Unit connected to the second GCN layer; an average pooling layer connected to the second GCN layer; a fully connected network (FCN); and a feature vector converting layer. The first GCN layer is configured to receive detected keypoints of one of the detected objects, and the feature vector converting layer is configured to produce a feature vector representing pose of the one of the detected objects.

In certain embodiments, the method further include, for each of the keyframes:

detecting objects from the keyframe, wherein each of the detected objects is defined by a detected bounding box;

estimating detected keypoints from each of the detected bounding box to obtain detected keypoints;

identifying each of the detected objects by comparing the detected keypoints of the detected objects against stored keypoints of each of stored objects, each of the stored objects having an object identification (ID); and assigning the detected objects with the object ID of one of the stored objects when the detected keypoints match the stored keypoints of the one of the stored objects.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 8 shows pose pairs collected from PoseTrack'18 dataset in Table 1.

FIG. 9, Table 2 shows comparison of detectors in Table 2 according to certain embodiments of the present disclosure.

FIG. 10 shows comparison of offline pose tracking results using various detectors on PoseTrack'17 validation set in Table 3 according to certain embodiments of the present disclosure.

FIG. 11 shows comparison of offline and online pose tracking results with various keyframe intervals on PoseTrack'18 validation set in Table 4 according to certain embodiments of the present disclosure.

FIG. 12 shows performance comparison of LightTrack with GCN and SC on PoseTrack'18 validation set in Table 5 according to certain embodiments of the present disclosure FIG. 13 shows performance comparison on PoseTrack dataset in Table 6 according to certain embodiments of the present disclosure.

DETAILED DESCRIPTION

Figure 1:
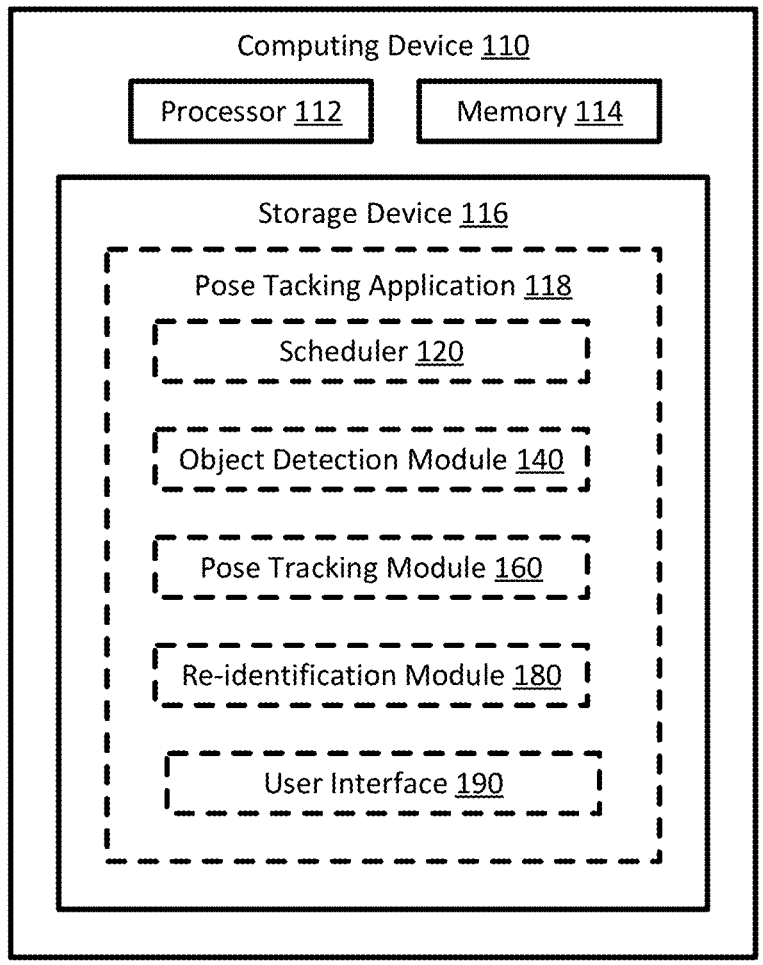
FIG. 1 schematically depicts a system for online top-down human pose tracking according to certain embodiments of the disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a computing system for online top-down human pose tracking according to certain embodiments of the present disclosure. Here top-down means that pose estimation is performed after candidates are detected, and the tracking is truly online. The system unifies Single Pose Tracking (SPT) with multi-person identity association, and bridges keypoint tracking with object tracking.

In contrast to Visual Object Tracking (VOT) methods, in which the visual features are implicitly represented by kernels or convolutional network (CNN) feature maps, the present disclosure tracks each human pose by recursively updating the object/bounding box and its corresponding pose in an explicit manner. The bounding box region of a target object is inferred from the explicit features, i.e., the human keypoints. Human keypoints can be considered as a series of special visual features. The advantages of using pose as explicit features include: (1) The explicit features are human-related and interpretable, and have very strong and stable relationship with the bounding box position. Human pose enforces direct constraint on the bounding box region. (2) The task of pose estimation and tracking requires human keypoints be predicted in the first place. Taking advantage of the predicted keypoints is efficient in tracking the region of interest (ROI), which is almost free. This mechanism makes the online tracking possible. (3) It naturally keeps the identity of the candidates, which greatly alleviates the burden of data association in the system. Even when data association is necessary, the disclosure can re-use the pose features for skeleton-based pose matching. SPT and Single VOT are thus incorporated into one unified functioning entity, easily implemented by a replaceable single-person human pose estimation module.

The contributions of the present disclosure, among other things, includes: (1) The disclosure proposes a general online pose tracking framework that is suitable for top-down approaches of human pose estimation. Both human pose estimator and Re-ID module are replaceable. In contrast to Multi-Object Tracking (MOT) frameworks, the framework according to the present disclosure is specially designed for the task of pose tracking. To the best of our knowledge, this is the first disclosure to propose an online human pose tracking system in a top-down fashion. (2) The disclosure provides a Siamese Graph Convolution Network (SGCN) for human pose matching as a Re-ID module. Different from existing Re-ID modules, the disclosure uses a graphical representation of human joints for matching. The skeleton-based representation effectively captures human pose similarity and is computationally inexpensive. It is robust to sudden camera shift that introduces human drifting. (3) We conduct extensive experiments with various settings and ablation studies. Our online pose tracking approach outperforms existing online methods and is competitive to the offline state-of-the-arts but with much higher frame rates.

The present disclosure provides a novel top-down pose tracking network. In this framework, we considers accurate human locations and estimation of human poses at the same time, where: (1) coarse person location can be distilled into body keypoints by a single-person pose estimator; (2) the position of human joints can be straightforwardly used to indicate rough locations of human candidates; and (3) thus, recurrently estimating one from the other is a feasible strategy for Single-person Pose Tracking (SPT).

Further, in this disclosure, the Multi-target Pose Tracking (MPT) problem is not merely consider as a repeated SPT problem for multiple individuals. The reason is that certain constraints need to be met, e.g., in a certain frame, two different IDs should not belong to the same person; neither two candidates should share the same identity. Accordingly, the present disclosure provides method to track multiple individuals simultaneously and preserve/update their identities with an additional Re-ID module.

The Re-ID module is essential because it is usually hard to maintain correct identities all the way. It is unlikely to track the individual poses effectively across frames of the entire video. For instance, under the following scenarios, identities have to be updated: (1) some people disappear from the camera view or get occluded; (2) new candidates come in or previous candidates re-appear; (3) people walk across each other (two identities may merge into one if not treated carefully); (4) tracking fails due to fast camera shifting or zooming.

The present disclosure first treats each human candidate separately such that their corresponding identity is kept across the frames. In this way, the disclosure circumvent the time-consuming offline optimization procedure. In case the tracked candidate is lost due to occlusion or camera shift, the disclosure then calls the detection module to revive candidates and associate them to the tracked targets from the previous frame via pose matching. In this way, the disclosure accomplish multi-target pose tracking with an SPT module and a pose matching module.

As shown in FIG. 1, the system 100 includes a computing device 110. In certain embodiments, the computing device 110 shown in FIG. 1 may be a server computer, a cluster, a cloud computer, a general-purpose computer, a headless computer, or a specialized computer, which provides pose tracking services. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In certain embodiments, the computing device 110 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

In certain embodiments, the computing device 114 may further include graphic card to assist the processor 112 and the memory 114 with image processing and display.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device110 may have multiple storage devices 116, which may be identical storage devices or different types of storage devices, and the applications of the computing device 110 may be stored in one or more of the storage devices 116 of the computing device 110.

In this embodiments, the processor 112, the memory 114, the storage device 116 are component of the computing device 110, such as a server computing device. In other embodiments, the computing device 110 may be a distributed computing device and the processor 112, the memory 114 and the storage device 116 are shared resources from multiple computers in a pre-defined area.

The storage device 116 includes, among other things, a pose tracking application 118. In certain embodiments, the pose tracking application 118 is an online pose tracking application. The pose tracking application 118 includes a scheduler 120, an object detection module 140, a pose tracking module 160, a re-identification module 180, and optionally a user interface 190. In certain embodiments, the storage device 116 may include other applications or modules necessary for the operation of the pose tracking application 118. It should be noted that the modules 120, 140, 160, 180 and 190 are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code.

The scheduler 120 is configured to receive or retrieve a series frames or images for processing. In certain embodiments, the series frames are time series frames, such as an online video or a live video. The video may be a red-green-blue (RGB) video, a black and white video, or a video in any other formats. The scheduler 120 is configured to define a keyframe from every N frames, where N is a positive integer. The number N may be predefined based on complexity of the series frames, computing power of the computing device 110, speed requirement for tracking , and accuracy requirement for tracking, etc. In certain embodiments, N is in a range of 5-100. In certain embodiments, N is in a range of 5-30. In certain embodiments, N is in a range of 10-20. In one embodiment, N equals to 10, that is, the frames 1, 11, 21, 31, . . . of the video are keyframes. Unless otherwise indicated, the following embodiments are described using N=10, but the disclosure is not limited to this definition of N. In certain embodiments, the scheduler 120 includes a counter to count the frames, so as to know what is a current frame to be processed, what is a previous frame immediately before the current frame, and what is an upcoming frame or a next frame immediately after the current frame. In certain embodiments, the scheduler 120 is configured to load the video to the memory 114 in real time. In certain embodiments, the scheduler 120 may load a predetermined number M of frames of the video in the memory 114, such as in a sliding window style, and the oldest frames are removed from the memory 114 in a first-in, first-out (FIFO) method. In certain embodiments, the number M is the total length of the video as long as the memory 114 is sufficient to keep the video, and remove the oldest frames only when the usage of the memory 114 surpasses a predefined percentage, such as 30%, 50%, 70%, etc. In certain embodiments, the number M is a positive integer from 1-1000. In certain embodiments, the number M is a positive integer from 1-100. In certain embodiments, the number M is a positive integer from 1-10. In certain embodiments, the number M is a positive integer of 10, and frames from one keyframe to the next keyframe are loaded in the memory 114. In certain embodiments, the number M is 1, and the memory 114 only keeps the current frame to be processed. The scheduler 120 is further configured to maintain certain input and output of the frame processing steps in the memory 114. The input and output information may include object or target ID, bounding box ID (optionally), keypoints of each bounding box, state of the target in the corresponding bounding box. In certain embodiments, the scheduler 120 may also store those information in the storage device 116 or keep a copy of the information in the storage device 116. The scheduler 120 is configured to call the modules 140, 160 and 180 to perform certain function at different time.

After loading of the video into the memory 114, the scheduler 120 is configured to process the frames of the video sequentially. When the first frame of the video is to be processed, the scheduler 120 is configured to call the object detection module 140 and the pose tracking module 160 to operate. After being called, the object detection module 140 is configured to detect objects (or targets, or candidates) from the first frame. Each object is defined with a bounding box, and each object is labeled with an object ID and is related to the frame (or optionally labeled with a frame ID), and include coordinates of the bounding box in the first frame. In certain embodiments, each object is linked to the corresponding frame, and the label of the frame ID to the object is not needed. After detecting the bounding boxes of the objects, the pose tracking module 160 is configured to estimate pose for each object in parallel (or optionally estimate pose for the objects in sequence). For each bounding box of an object, the pose tracking module 160 is configured to determine keypoints in the bounding box, for example using a convolutional neural network (CNN) and heatmap generated by the CNN. Each keypoint corresponds to a confidence score based on the heatmap, indicating the possibility that the keypoint is located in the frame. The keypoints defines pose of the object. In certain embodiments, the number of the keypoints for each object is 15, and the 15 keypoints are, for example, "right knee," "left knee," "right pelvis," "left pelvis," "right wrist," "left wrist," "right ankle," "left ankle," "right shoulder," "left shoulder," "left elbow," "right elbow," "neck," "nose," "head." In certain embodiments, the 15 keypoints are defined and stored in a specific sequence. Kindly note the number of categories of keypoints is not limited thereto, and there may be more or fewer categories of keypoints than described in the embodiments. The keypoints defines pose of the object and the determination of the keypoints as described above is also called estimation of pose. After pose estimation, each object in the first frame is defined by: object ID and optionally frame ID, coordinates of the bounding box, coordinates of the keypoints, and confidence score of each keypoint or average confidence score of all the keypoints. In certain embodiments, those explicit and simple information are stored in the memory 114. The pose tracking module 160 is then configured to infer an inferred bounding box for each object from the determined keypoints. In certain embodiments, the inferred bounding box is inferred by: defining an enclosing box (or namely minimum bounding box or smallest bounding box) with the smallest measure within which all the points lie, and enlarging the rectangular box by 20% in horizontal direction and vertical direction to obtain the inferred bounding box. The enclosing box is also called minimum bounding box or smallest bounding box. In certain embodiments, the enclosing box is provided by picking up the top-most keypoint, the lowest keypoint, the leftmost keypoint, and the rightmost keypoint from the 15 keypoints, and draw a rectangular box. The top of the rectangular is determined by the y-coordinate of the top-most point, the bottom of the rectangular is determined by the y-coordinate of the lowest point, the left side of the rectangular is determined by the x-coordinate of the leftmost point, and the right of the rectangular is determined by the x-coordinate of the rightmost point, At this time, the scheduler 120 determines that the first frame has been processed and optionally records the first frame as being processed by a counter, and is configured to call the pose tracking module 160 to process the second frame. In certain embodiments, the pose tracking module 160 may continue to process the frames until a frame count is met and the scheduler 120 interrupts the operation of the pose tracking module 160. Based on the assumption by the present disclosure that the location and pose of an object are generally similar in two sequential frames, the pose tracking module 160 is configured to perform CNN using the inferred bounding box and the second frame, generate heatmaps, and determine keypoints using the heatmaps, where all the keypoints in the second frame are located in the area that is enclosed by the inferred bounding box. Each keypoint has a confidence score, and the pose tracking module 160 is further configured to determine object state in the second frame based on the average confidence score of the keypoints. The object state is "tracked" in the second frame if the average confidence score is greater than a threshold value, and the object state is "lost" in the second frame if the average confidence score equals to or is lower than the threshold value. When the object state is "tracked," the pose tracking module 160 is configured to generate an enclosing box using four keypoints from the second frame, and infer an inferred bounding box from the enclosing box. When the object state in the second frame is determined as "tracked," the inferred bounding box from the first frame is regarded as the bounding box of the corresponding object in the second frame. At this time, for the object that is determined to be "tracked" in the second frame, the pose tracking module 160 stores the frame ID, the object ID, coordinates of the bounding box (the inferred bounding box), coordinates of the keypoints, and confidence scores of the keypoints. Similarly, to the process described above, the pose tracking module 160 uses the inferred bounding box from the second frame to estimate keypoints in the third frame, determine object state, and when the object state is checked, generate a bounding box using four keypoints and infer an inferred bounding box. The pose tracking module 160 is configured to continue processing the sequential frames until the next keyframe (for example frame 11) or a specific non-keyframe when the object state in the non-keyframe is "lost." As for a frame immediately before the next keyframe, such as frame 10, the pose tracking module 160 determines the object state, and of the object state is "tracked," generate an enclosing box based on the keypoints as the bounding box of frame 10. However, there is no need to infer an inferred bounding box, because the scheduler 120 will schedule a new object detection for the next keyframe.

As described above, the first frame (or frame 1) is defined as the first keyframe, and frame 11 is defined as the second keyframe. When the scheduler 120 counts that frame 11 is to be processed, the scheduler 120 is configured to call the object detection module 140, the pose tracking module 160 and the re-identification module 180 to process the keyframe 11. Specifically, the object detection module 140 detects objects from the keyframe 11 and output a bounding box for each object. For each bounding box corresponding to one of the detected objects, the pose tracking module 160 determines keypoints, and estimates pose of the object. The re-identification module 180 compares keypoints of each of the objects against the keypoints of the stored objects from the previous frame to see whether there is a match. If there is a match, the object from the keyframe 11 is assigned with the same object ID as that of the matched object from the frame 10. If no match is found for that object, the object would be assigned with a new object ID. In this embodiments, the match is performed on the objects from the current frame to those objects from the immediately previous frame. In other embodiments, the match may also be performed between the objects from the current frame to objects from a number of previous frames, such as 2, 5 or 10 previous frames. After re-identification, the pose tracking module 160 continues to infer bounding boxes, estimated keypoints and calculate object state in frame 12. The following processing of frames 12-19 is substantially the same as the processing of the frames 2-9. Similarly, the processing of frame 20 and 21 is substantially the same as the processing of the frame 10 and the frame 11.

In certain embodiments, each object is tracked by the pose tracking module 160 independently from other objects. When one object is "lost," the scheduler 120 is configured to instruct object detection, post estimation, and re-identification right away from the next frame for all the objects. In certain embodiments, if the number of "lost" objects is greater than a predetermined threshold or the percentage of "lost" objects is greater than a predetermined percentage, the scheduler 120 initiate a new object detection from the next frame. In certain embodiments, if only one or few objects from a plurality of objects are "lost," the scheduler 120 may drop the tracking of the "lost" objects and continue the tracking of the "tracked" objects, and start a new object detection until the next keyframe.

When processing a specific non-keyframe where the object state in the frame is "lost," the processing of that frame is similar to the processing of a keyframe. In other words, the "lost" state of the object triggers new object detection in the specific non-keyframe. In certain embodiments, when quality of the specific non-keyframe is low, the process may also skip the frame and start processing the next frame. During re-identification, the objects (keypoints) from the next frame is compared to one of the previous frames but not necessarily the immediately previous frame.

After being called, each of the object detection module 140, the pose tracking module 160 and the re-identification module 180 may be stayed active in the memory 114, so as to process the upcoming frame according to the instruction by the scheduler 120. In certain embodiments, the pose tracking application 118 may not include the scheduler 120, and the function of the scheduler 120 may be assigned to the object detection module 140, the pose tracking module 160 and the re-identification module 180.

The object detection module 140 is configured to detect objects from the first frame (keyframe), the following keyframes, and any specific non-keyframe where object state is "lost." The object detection module 140 in the pose tracking application 118 may be any of object detectors and is replaceable. In certain embodiments, the object detection module 120 uses a convolutional neural network (CNN) for object detection. In certain embodiments, the object detection module 140 includes a deformable ConvNets with ResNet101 as backbone, feature pyramid Networks (FRN) for feature extraction, and fast R-CNN scheme as detection head. In certain embodiments, the object detection module 140 may use other types of detection process, such as using R-FCN as backbone, or use ground truth (GT) detections.

In certain embodiments, the input of the object detection module 140 is an RGB frame, the output of the object detection module 140 is a plurality of objects, and each object is defined with a bounding box. In certain embodiments, the object may be human only. As described above, each of the objects may be featured by a frame ID and coordinates of the bounding box. In certain embodiments, the bounding box of one object may be expressed by a feature vector, or a simple text. In certain embodiments, the feature of the bounding boxes is preferably stored in the memory 114, or alternatively stored in at least one of a graphic card or video memory, the storage device 116, or a remote storage device accessible by the computing device 110.

The pose tracking module 160 is configured to, upon receiving objects of the first frame (the first keyframe) from the object detection module 140, determine keypoints of the object in the corresponding bounding box and estimate pose of the object in the current frame, assign an object ID to the object, and store the object with frame ID, object ID, coordinates of the bounding box, coordinates of the keypoints, and confidence score of the keypoints to the memory 114. The pose tracking module 160 is further configured to generate an enclosing bounding box based on the keypoints, and infer an inferred bounding box for processing the second frame.

The pose tracking module 160 is configured to, upon receiving objects of the keyframes (other than the first frame) or objects of a specific non-keyframe (that has object state of "lost"), determine keypoints of the object in the corresponding bounding box and estimate pose of the object in the frame, re-identify the object through the re-identification module 180, and store the object with frame ID, object ID, coordinates of the bounding box, coordinates of the keypoints, and confidence score of the keypoints to the memory 114. The pose tracking module 160 is further configured to generate an enclosing bounding box based on the keypoints, and infer an inferred bounding box for processing the next frame.

The pose tracking module 160 is configured to, upon receiving inferred bounding boxes (inferred based on keypoints of the object in the previous frame, and labeled with object ID) for a non-keyframe (current frame), determine keypoints of the object in the current frame and estimate pose of the object in the current frame, and store the object with frame ID, object ID, coordinates of the bounding box, coordinates of the keypoints, and confidence score of the keypoints to the memory 114. The pose tracking module 160 is further configured to determine object state in the current frame, and if the object state is "tracked," generate an enclosing bounding box based on the keypoints, and infer an inferred bounding box for processing the next frame. Then the pose tracking module 160 is further configured to process the next frame based on the inferred bounding box by: determining keypoints in the next frame enclosed by the inferred bounding box, estimating pose of the object, calculating confidence scores of the keypoints, and storing the keypoints and its bounding box. By repeating the above described process, recursive update of the bounding boxes and poses of the object in the sequential frames are achieved. Accordingly, tracking of the object in the series frames are realized. Because the tracking uses bounding boxes and keypoints, not kernels or feature maps, the tracking is fast and can be applied for online tracking. Otherwise, if the object state is "lost" in the current frame, the scheduler 120 would instruct object determination in the current frame from scratch.

Figure 2:
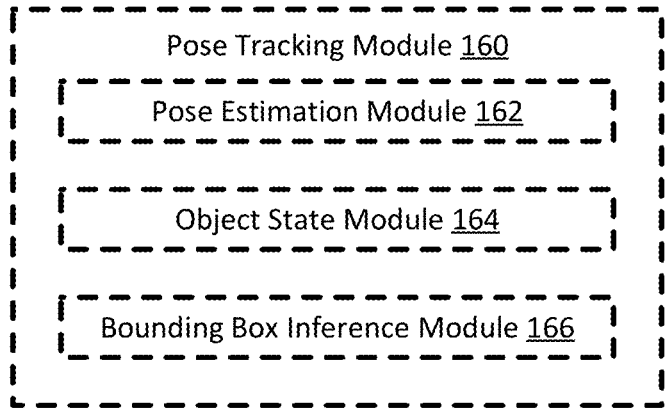
FIG. 2 schematically depicts a pose tracking module according to certain embodiments of the disclosure.

As shown in FIG. 2, the pose tracking module 160 includes a pose estimation module 162, an object state module 166, and a bounding box inference module 164. The pose estimation module 162 is configured to, upon receiving a detection result from the object detection module 140, determine keypoints and estimate pose for each of the objects. In certain embodiments, the pose estimation module 162 is a single person pose estimator or a single person pose tracking module. The object with bounding box and the corresponding keypoints are stored with a new object ID if there is no match between the object keypoints and the stored object keypoints; and the object is stored with an old ID if there is match between the object keypoints and the stored object keypoints.

The pose estimation module 162 is configured to, upon receiving an inferred bounding box from the bounding box inference module 166 (based on the previous frame), determine keypoints and estimate pose for each of the objects (in the current frame), get an object state calculated by the object state module 164, and when the object state is "tracked," store the object with bounding box and keypoints information. If the object state is "lost," the scheduler 120 will instruct object detection of the object in the current frame from scratch.

As described above, the pose estimation module 162 may either receive detected bounding boxes from the object detection module 140 or receive inferred bounding box from the bounding box inference module 164, so to recurrently perform pose estimation and keypoints determination. In certain embodiments, the inferred bounding box is resized before being inputted to the pose estimation module 162, such that the inputted detected bounding box or the inferred bounding box have a fixed size. In certain embodiments, the output of the pose estimation module 162 is a series heatmaps, which is then used to predict the keypoints. The sequential keypoints, each corresponding to a specific part of human body, indicate pose of the human object. The pose estimation module 162 is further configured to, after obtaining the pose estimation and keypoints determination result, stores the result. The result may include the frame ID, the object ID, coordinates of the bounding box, coordinates of the keypoints, and confidence score (or average confidence score) of the keypoints. The pose estimation module 162 takes the advantages that an object's coarse location defined by the bounding box helps the determination of the keypoints of the object, and the keypoints of the object indicates rough location of the object in the frame. By recurrently estimating the object location and the keypoints of the object, the pose estimation module 162 may estimate object pose and determine the object keypoints accurately and efficiently.

The object state module 164 is configured to, upon receiving the keypoints determined based on the current frame and the inferred bounding box (inferred from the previous frame), determine state of the object in the current frame. The state of the object is either "tracked" or "lost." In certain embodiments, the object state module 164 is configured to determine the state using confidence score. Specifically, with the inferred bouncing box from the previous frame and the determined keypoints from the current frame, the object state module 164 determines the possibility the determined keypoints reside in the region of the current frame that is covered by the inferred bounding box. The possibility is represented by a confidence score s, and each estimated keypoint has a confidence score. An average of the confidence scores $\bar{s}$ of the estimated keypoints of the object is calculated and compared to a standard error $\tau_s$. If the average scores $\bar{s}$ is greater than the standard error $\tau_s$, the state of the object in the current frame is "tracked," that is, the object is believed to be located in the inferred bounding box in the current frame. Otherwise, the state of the of the object is "lost," that is, the object is believed to be not located in the current frame enclosed by the inferred bounding box. The state of the object is defined as:

$$\text{State} = \begin{cases} \text{tracked, if } \bar{s} > \tau_s, \\ \text{lost, otherwise} \end{cases} \quad (1)$$

In the above embodiment, the average of the confidence scores $\bar{s}$ of all the keypoints, for example 15 keypoints, are used. In other embodiments, the average of the confidence scores $\bar{s}$ may also be calculated using the several keypoints that have highest confidence scores. For example, the average confidence scores s may be the average of the confidence scores of the top 3, 4 or 5 of the keypoints.

In certain embodiments, the confidence scores come from heatmaps generated by operating a convolutional neural network, and the obtained confidence scores have a value from 0 to about 1.5. In certain embodiments, the obtained confidence scores are sigmoid value of that from the CNN, where the confidence scores in in a range of 0-1. In certain embodiments, when the confidences scores are in a range of 0-1, the standard error $\tau_s$, or a threshold, is predefined as a value between 0.3-1.0. In certain embodiments, the standard error $\tau_s$ is in a range of 0.6-0.9. In certain embodiments, the standard error $\tau_s$ is in a range of 0.7-0.8. In one embodiment, the standard error $\tau_s$ is set at 0.75.

The bounding box inference module 166 is configured to, upon receiving the keypoints of the object in the current non-keyframe, infer an inference bounding box for processing the next frame. The inferred bounding box is treated as the localized region for the object in the next frame. In certain embodiments, the inference bounding box is defined by determining an enclosing bounding box based on the topmost, the lowest, the left most, and the right most keypoints, and enlarging the enclosing bounding box. In certain embodiments, the inference bounding box is obtained by enlarging the enclosing bounding box along the x and y direction by 5-50%. In certain embodiments, the enlargement is about 10-30%. In certain embodiments, the enlargement is 20%; for example, if coordinates of four corners of the current bounding box are $(x_1, y_1), (x_2, y_1), (x_1, y_2), (x_2, y_2)$, where $x_2 > x_1$ and $y_2 > y_1$, then coordinates of four corners of the inference bounding box would be $((1.1x_1-0.1x_2), (1.1y_1-0.1y_2)), ((1.1x_2-0.1x_1), (1.1y_1-0.1y_2)), ((1.1x_1-0.1x_2), (1.1y_2-0.1y_1)), ((1.1x_2-0.1x_1), (1.1y_2-0.1y_1))$.

Kindly note that when the object or target is lost, the disclosure provides two modes for correction: (1) Fixed Keyframe Interval (FKI) mode. Neglect this target until the scheduled next keyframe, where the detection module re-generate the candidates and then associate their IDs to the tracking history. (2) Adaptive Keyframe Interval (AKI) mode. Immediately revive the missing target by candidate detection and identity association. In certain embodiments, the advantage of FKI mode is that the frame rate of pose tracking is stable due to the fixed interval of keyframes. The advantage of AKI mode is that the average frame rate can be higher for noncomplex videos. In certain embodiments shown in the experiment section, the disclosure incorporates them by taking keyframes with fixed intervals while also calling detection module once a target is lost before the arrival of the next arranged keyframe. The tracking accuracy is higher because when a target is lost, it is handled immediately.

The re-identification module 180 is configured to, after the object detection module 140 detects objects (bounding boxes) from a keyframe (but not the first frame) or from a specific non-keyframe (object state is "lost" in the specific non-keyframe), and the pose tracking module 160 determines keypoints for each object, compare keypoints of each detected object against previously stored keypoints of each stored objects. When one of the detected objects matches one of the previously stored object, the re-identification module 180 assigns the detected object the same object ID as the matched object, and assigns the detected object a new object ID when there is no match. In certain embodiments, the comparison is against the bounding boxes/keypoints of the objects from the immediately previous frame, or the bounding boxes/keypoints of the objects from a few immediately previous frames. In certain embodiments, a sequence of poses from multiple previous frames are used with a spatio-temporal SGCN for providing more robust results. In certain embodiments, when the object detection module 140 detects object from the first frame (also the first keyframe), the re-identification module 180 does not require to be called because there is no stored objects yet, and each object is assigned with a new object ID.

In certain embodiments, the re-identification module 180 considers two complementary information: spatial consistency and pose consistency for re-identification of a bounding box. In certain embodiments, match between a bounding box from the current frame and a bounding box from one or more previous frames is determined by their adjacency. The two bounding boxes have intersection over union (IOU), and when the IOU between the two bounding boxes is above a threshold, the two bounding boxes are considered being belong to the same object (or target). In certain embodiments, a matching flag $m(t_k, d_k)$ is set to 1 if the maximum IOU overlap ration $o(t_k, D_{i,k})$ between the tracked object $t_k \in T_k$ and the corresponding detection $d_k \in D_k$ for keyframe k is higher than the threshold $\tau_o$. Otherwise, $m(t_k, d_k)$ is set to 0:

$$m(t_k, d_k) = \begin{cases} 1, & \text{if } o(t_k, D_{i,k}) > \tau_o, \\ 0, & \text{otherwise} \end{cases} \quad (2)$$

In certain embodiments, the above criterion is based on the assumption that the tracked target (bounding box) from the previous frame and the actual location of the target (bounding box) in the current frame have significant overlap.

Figure 3:
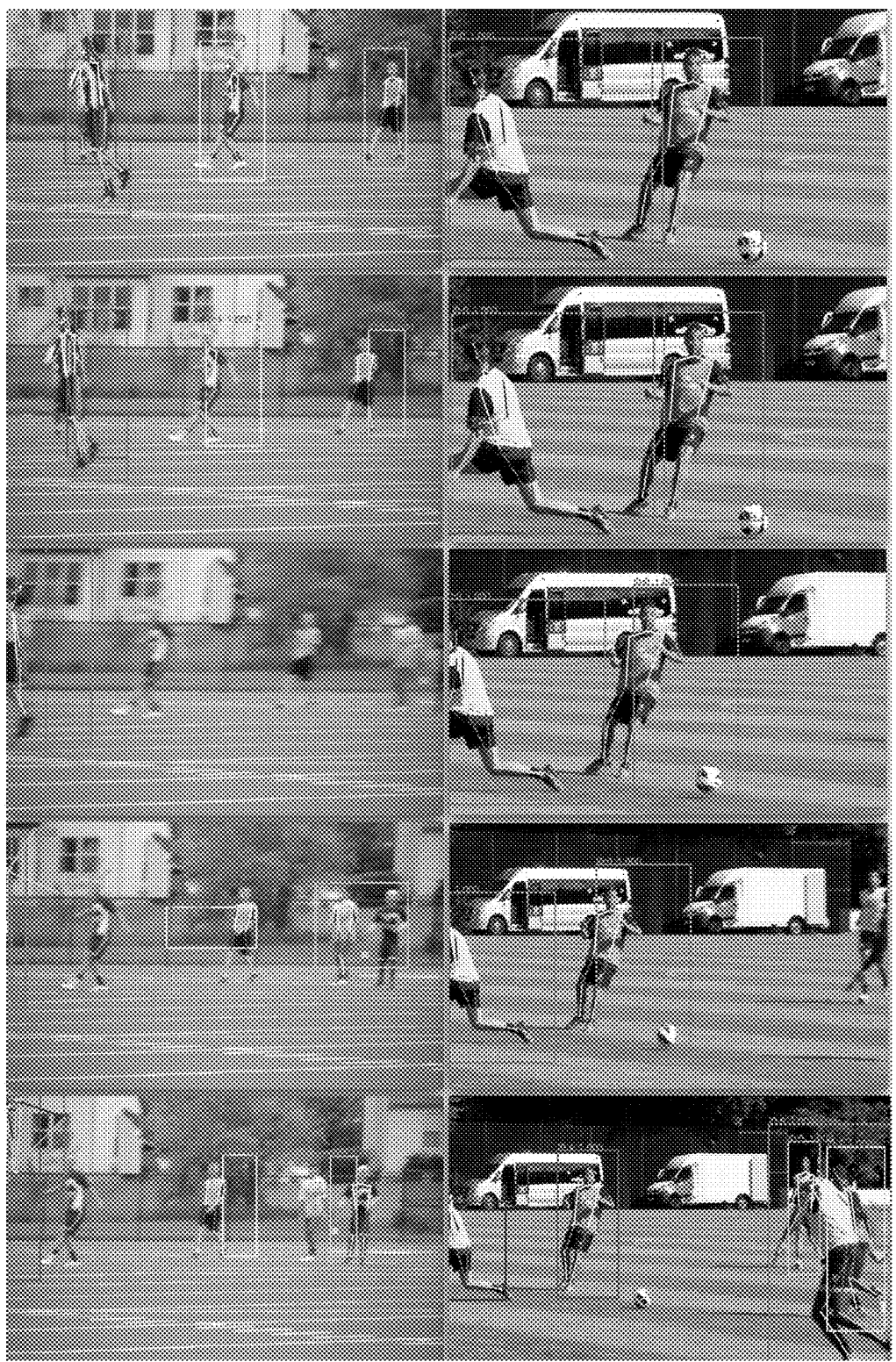
FIG. 3 schematically depicts a sudden camera shift in a video and a sudden camera zooming in a video according to certain embodiments of the disclosure.

However, such assumption is not always reliable, especially when the camera shifts swiftly. In certain embodiments, we need to match the new observation to the tracked candidates. In Re-ID problems, this is usually accomplished by a visual feature classifier. But visually similar candidates with different identities may confuse such classifiers. Extracting visual features can also be computationally expensive in an online tracking system. Therefore, to overcome the shortcomings, the present disclosure designs a Graph Convolution Network (GCN) to leverage the graphical representation of human joints or human keypoints. The disclosure observes that in two adjacent frames, the location of a person may drift away due to sudden camera shift, but the human pose will stay almost the same as people usually cannot act that fast, as illustrated in FIG. 3. The left frames in FIG. 3 show sequential adjacent frames with sudden camera shift, where the shift in the third frame from the top is obvious, and tracking of human targets are unlikely to be successful. The right frames in FIG. 3 shows sudden zooming, where frames 3-5 from the top are suddenly zooming out, and tracking using the same/similar sized bounding box on the human target are unlikely to be successful. In certain embodiments, the present disclosure uses graph representation of human skeletons for candidate matching, which is named pose matching as follows.

Figure 4:
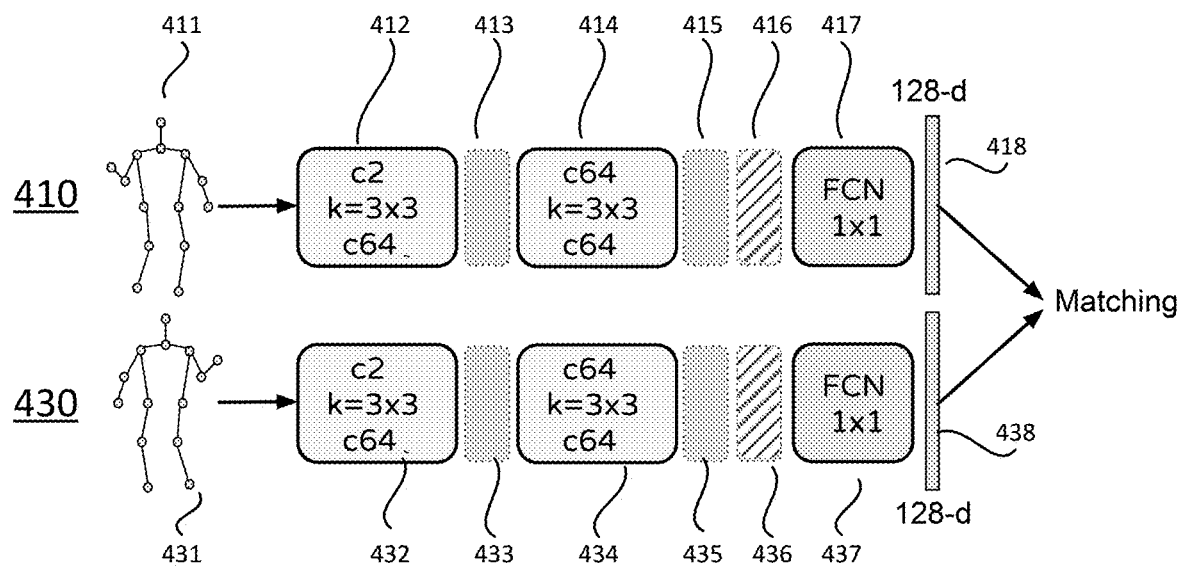
FIG. 4 schematically depicts a Siamese Graph Convolution Network (SGCN) according to certain embodiments of the disclosure.

In certain embodiments, the re-identification module 180 uses a Siamese Graph Convolutional Network (SGCN) for pose matching, that is, the re-identification module 180 matches two objects using poses of the objects in the bounding boxes. FIG. 4 schematically shows an SGCN according to certain embodiments of the present disclosure. As shown in FIG. 4, the SGCN includes two duplicated submodels 410 and 430 for receiving keypoints input 411 from the detected object and keypoints input 431 from the object (bounding box) dataset. The submodel 410 includes a first graph convolution layer 412, a first Relu Unit 413, a second graph convolution layer 414, a second Relu Unit 415, a first average pooling layer 416, a first fully connected layer 417, and similarly, the submodel 430 includes a third graph convolution layer 432, a third Relu Unit 433, a fourth graph convolution layer 434, a fourth Relu Unit 435, a second average pooling layer 436, and a second fully connected layer 437. In certain embodiments, the layers 412 to 417 are sequentially arranged, the layers 432 to 437 are sequentially arranged, and model structure and parameters of the submodels 410 and 430 are the same.

When pose matching is required, the re-identification module 180 is configured to input the keypoints 411 from the target object (bounding box) to the first GCN layer 412 and input keypoints 431 from the stored object (bounding box) to the third GCN layer 432. In certain embodiments, the keypoints has 2D coordinates in the detected graph (current frame), and the keypoints 411 are in a form of coordinate vectors. The keypoints 411 are input of the first GCN layer 412. In certain embodiments, the first GCN layer 412 constructs a spatial graph with the keypoints as graph nodes and connectivity in human body structures as graph edges, and the keypoints 411 are inputted on the graph nodes. As shown in FIG. 4, in certain embodiments, the first GCN layer 412 has a two-channel input, and output a 64-channel output. The 64-channel output goes through the first Relu unit 413, and inputs to the second GCN layer 414. Both the input and the output of the second GCN layer 414 have 64 channels. The output of the second GCN layer 414 passes through the second Relu unit 415 and the average pooling layer 417, and forms a 128 dimension feature representation vector 418 as a conceptual summary of the human pose. By the same process, the keypoints 431 from the stored object (bounding box) are inputted to the submodel 430, and after processing by the submodel 430, outputted a 128 dimension feature representation vector 438. The re-identification module 180 then matches the feature representation vectors 418 and 438 in a vector space, and determines that the two vectors represent the same pose if the two vectors are close enough in the vector space. In certain embodiments, a threshold value is pre-defined to make the judgement, where two feature vectors are regarded as matched when a distance between the two vectors is smaller than the threshold. Kindly note the pose of the human is represented by the latent feature vector generated by the GCN, which may correspond to standing, sitting, or any other possible posture of the human.

In certain embodiments, the SGCN network is optimized with contrastive loss L, because the disclosure wants the network to generate feature representations that are close by enough for positive pairs, whereas they are far away at least by a minimum for negative pairs. The disclosure employs the margin contrastive loss:

$$L(p_j, p_k, y_{jk}) = 1/2 y_{jk} D^2 + 1/2(1 - y_{jk}) \max(0, \in -D^2) \quad (3),$$

where $D = \|f(p_j) - f(p_k)\|_2$ is the Euclidean distance of two $l_2$-norm normalized latent representations, $y_{jk} \in \{0, 1\}$ indicates whether $p_j$ and $p_k$ are the same pose or not, and $\in$ is the minimum distance margin that pairs depicting different poses should satisfy.

The graph convolution layers 412, 414, 432, 434 performs convolution for skeleton, that is, human joints or keypoints. In certain embodiments, for standard 2D convolution on natural images, the output feature maps can have the same size as the input feature maps with stride 1 and appropriate padding. In certain embodiments, the graph convolution operation is similarly designed to output graphs with the same number of nodes. The dimensionality of attributes of these nodes, which is analogous to the number of feature map channels in standard convolution, may change after the graph convolution operation.

In certain embodiments, the standard convolution operation is defined as follows:

given a convolution operator with the kernel size of K×K, and an input feature map $f_{in}$ with the number of channels c, the output value of a single channel at the spatial location x can be written as:

$$f_{out}(x) = \sum_{h=1}^{K} \sum_{w=1}^{K} f_{in}(s(x, h, w)) \cdot w(h, w) \quad (4),$$

where the sampling function s: $Z^2 \times Z^2 \rightarrow Z^2$ enumerates the neighbors of location x.

Figure 5:
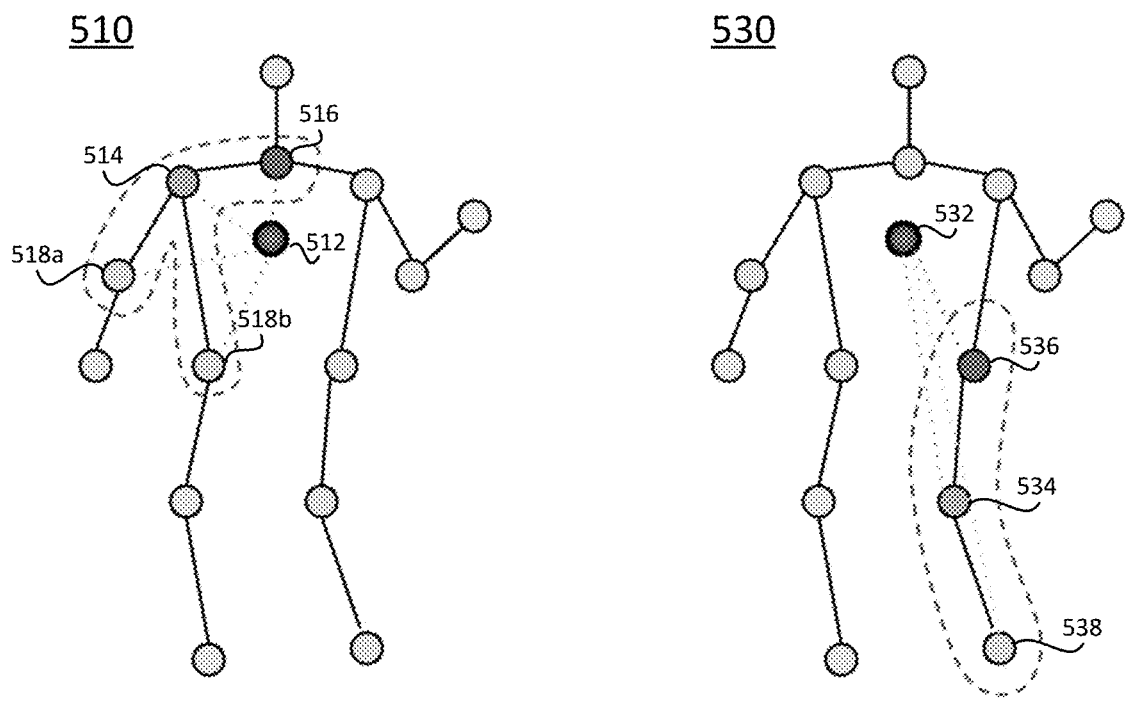
FIG. 5 schematically depicts a spatial configuration strategy for graph sampling and weighting to construct graph convolution operations according to certain embodiments of the disclosure.

The weight function w: $Z^2 \rightarrow \mathbb{R}^c$ has a vector on each node of the graph. The next step of the extension is to re-define the sampling function p and the weight function w. The disclosure follows the method proposed in Yan (Yan, S, et al., spatial temporal graph convolutional networks for skeleton-based action recognition, AAAI, 2018, which is incorporated herein by reference in its entirety). For each node, only its adjacent nodes are sampled. The neighbor set for node $v_i$ is: $B(v_i) = \{v_j | d(v_j, v_i) \leq 1\}$. The sampling function p: $B(v_i) \rightarrow V$ can be written as: $p(v_i, v_j) = v_j$. In this way, the number of adjacent nodes is not fixed, nor is the weighting order. In order to have a fixed number of samples and a fixed order of weighting them, the disclosure labels the neighbor nodes around the root node with fixed number of partitions, and then weight these nodes based on their partition class. FIG. 5 schematically shows a spatial configuration partitioning strategy for graph sampling and weighting to construct graph convolution operations. As shown in FIG. 5, for two skeletons 510 and 530, the skeleton gravity center 512 and 532 are determined. The nodes are labeled according to their distances to the skeleton gravity center 512/532 compared with that of the root node 514/534. Centripetal nodes 516/536 have shorter distances, while centrifugal nodes 518a/518b/538 have longer distances than the root node.

Therefore, equation (4) for graph convolution is re-written as:

$$f_{out}(v_i) = \sum_{v_j \in B(v_i)} \frac{1}{Z_i(v_j)} f_{in}(p(v_i, v_j)) \cdot w(v_i, v_j), \quad (5)$$

where the normalization term $Z_i(v_j) = |\{v_k | l_i(v_k) = l_i(v_j)\}|$ is to balance the contributions of different subsets to the output. According to the partition method mentioned above, the disclosure has:

$$l_i(v_j) = \begin{cases} 0 & \text{if } r_j = r_i \\ 1 & \text{if } r_j < r_i, \\ 2 & \text{if } r_j > r_i \end{cases} \quad (6)$$

where $r_i$ is the average distance from gravity center to joint or keypoint i over all frames in the training set.

In certain embodiments, the re-identification module 180 uses both the spatial consistency and pose consistency for bounding box (or object) matching. When spatial consistency is determined, matching between two bounding boxes are determined, and further pose match may not be necessary. When spatial consistency is determined to not match, pose matching is further conducted because a human's pose is unlikely to change in two neighboring frames. In certain embodiments, other combinations of spatial consistency and pose consistency are possible. For example, a matched bounding box with unmatched pose may also be regarded as not a match. In certain embodiments, when the re-identification module 180 determines that a detected bounding box match a stored bounding box, the re-identification module 180 is configured to assign the detected bounding box the same object ID (or target ID) as that of the stored bounding box.

Referring back to FIG. 1, the pose tracking application 118 may further include a user interface 190. The user interface 190 is configured to provide a use interface or graphic user interface in the computing device 110. In certain embodiments, the user is able to configure parameters for the training or using the pose tracking application 118.

In certain embodiments, the pose tracking application 118 may further include a database, which may be configured to store at least one of training data, online video, and parameters of the pose tracking application 118, and input/output from the pose tracking application 118. However, the pose tracking application 118 is preferred to have the video to be processed, the bounding boxes, etc. loaded in the memory 114 for fast processing. In certain embodiments, the sub-modules of the pose tracking application 118 are designed as different layers of one integrated network, each layer corresponds to a specific function.

Figure 6:
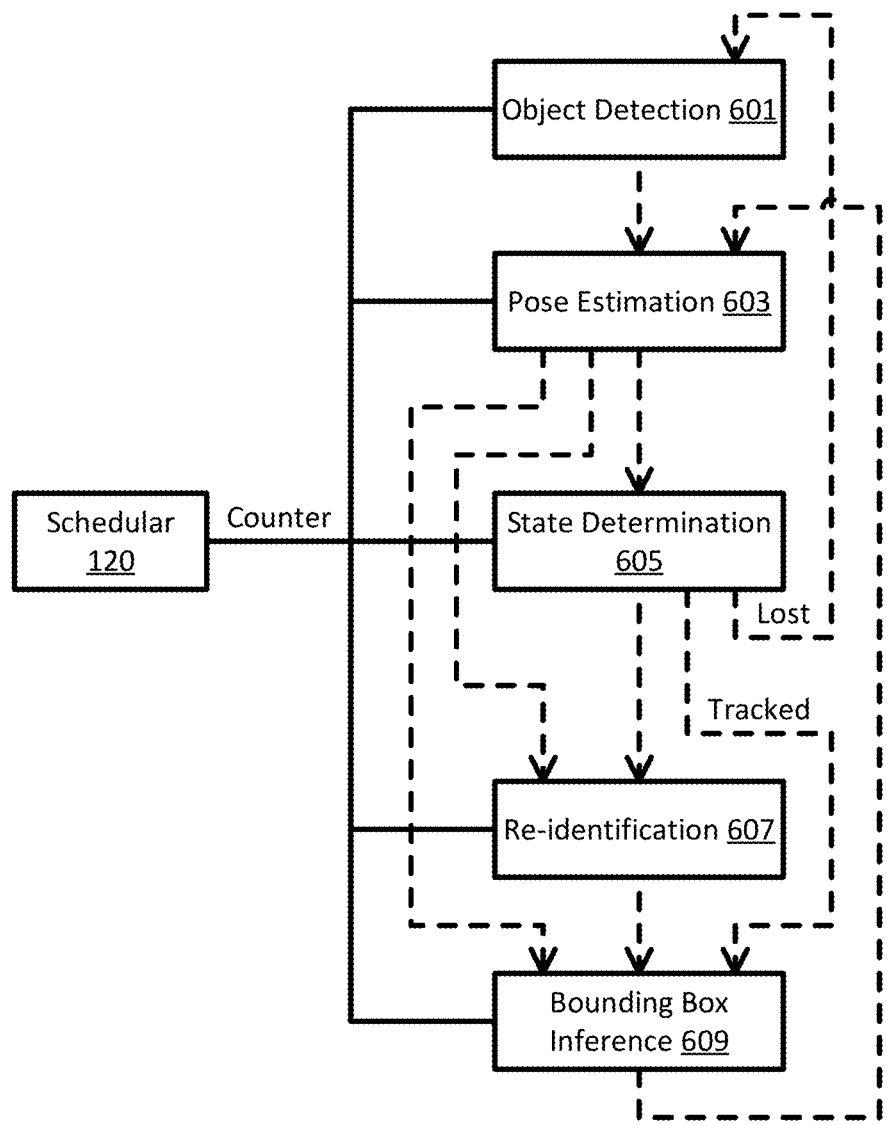
FIG. 6 schematically depicts a process of online human pose tracking according to certain embodiments of the disclosure.

FIG. 6 is a flow chart showing procedures of performing the pose tracking application 118. The solid line indicates that the scheduler instructs operation of the procedures 601-609, and the dotted line indicates the possible data flow coordinated by the scheduler 120. The scheduler 120 also counts and tracks frames of a video to be processed.

As shown in FIG. 6, when processing the video, the scheduler 120 loads the video to the memory 114, brings up the first frame (also the first keyframe), and calls the operation of object detection 601, pose estimation 603, and bounding box inference 609. Specifically, the scheduler 120 calls the object detection module 140 to perform object detection 601. Each of the object is labeled with frame ID (frame 1), object ID (newly assigned ID for example from object 1), and coordinates (2D coordinates of four corners of the bounding box or two diagonal corners of the bounding box). The scheduler 120 then calls the pose estimation module 162 of the pose tracking module 160 to perform pose estimation 603, specifically determine keypoints from each bounding box. The sequential keypoints determines pose of the object. In certain embodiments, the number of the keypoints is 15. The keypoints may be determined using a heatmap generated by the pose estimation module 162, and the keypoints each has a confidence score indicating the possibility the keypoint exist in the bounding box. For the first frame, the scheduler 120 may not instruct operation of the state determination 605 and the re-identification 607, but instruct operation of the bounding box inference 609. The bounding box inference module 166 infers an inference bounding box from each of the bounding boxes, for example, by determining an enclosing bounding box using four keypoints in the far top, fat bottom, far left and far right, and enlarging the enclosing bounding box. The inference bounding box has the same object label as that of the corresponding current bounding box.

At this time, the scheduler 120 brings up the second frame, and counts the number of frames. In this embodiment, frame 2 is a non-keyframe, and the keyframes are every 10 frames, that is, frames 1, 11, 21, 31, . . . The scheduler 120 calls the operation of pose estimation 603, state determination 605, and bounding box inference 609. Specifically, the scheduler 120 calls pose estimation module 162 to determine keypoints in the second frame, based on the inferred bounding box and the second frame. The object state module 164 then determines the object state in frame 2 using the confidence score of the determined keypoints. When the object state is "tracked," the keypoints and the bounding box (the enclosing bounding box) are stored, and the process goes to bounding box inference 609 to generate the inferred bounding box. Similarly, as described above, the inferred bounding box based on the second frame is used for the procession of the third frame. The processes of bounding box inference 609, pose estimation 603, state determination 605 repeats for the non-keyframes as long as the result form the state determination 605 is "tracked," and in each repeat, the frame ID, object ID, bounding box coordinates, keypoints coordinates with confidence score, are stored in the memory 114. For a non-keyframe (such as non-keyframe 10) immediately previous to a keyframe (such as keyframe 11), the process may only include bounding box inference 609 based on the $9^{th}$ frame, and pose estimation (keypoints determination) based on the inferred bounding box and the frame 10, but not include the state determination 605, because the scheduler 120 will instruct new object detection for frame 11 anyway.

For a keyframe other than the first frame, such as frame 11, the scheduler 120 calls the operation of object detection 601, pose estimation 603, re-identification 607, and bounding box inference 609. Specifically, when frame 10 is being processed and pose estimation 603 is done for frame 10, the scheduler bring up frame 11, calls the pose detection module 140 to detect bounding boxes from scratch, calls the pose estimation module 162 to determine keypoints, calls the re-identification module 180 to compare the detected bounding box/keypoints with stored bounding boxes/keypoints for pose matching. In certain embodiments, the comparison uses the detected bounding box/keypoints from frame 11 and that of frame 10. In certain embodiments, the comparison uses the detected bounding box/keypoints from frame 11 and several previous frames, such as frames 8-10, frames 6-10, frames 2-10, frames from the previous keyframe to frame 10, or more of the previous frames. When there is match, the detected bounding box/keypoints are labeled with the object ID the same as that of the matched bounding box/keypoints. When there is no match, the object corresponding to the detected bounding box is regarded as a new object, and the detected bounding box/keypoints are labeled with a new object ID. After this, the scheduler 120 instructs the bounding box inference module 166 to perform bounding box inference.

In the above described embodiments, the object detection 601 is performed to identify all the object in a current frame when one object is lost in the current frame. In certain embodiments, when the one object in the current frame is determined to be lost due to its low confidence score, the one object may correspond to a different object. Therefore, in certain embodiments, the keypoints of the one object may also be directly used to be compared with the objects stored in the system, to determine if the one object is actually another object. If the one object is determined to be another object, the one object is assigned with the label of the another object.

Further, for each frame, each object has a corresponding bounding box, and the keypoints of the objects are located within the bounding box. In certain embodiments, the object and the bounding box are used interchangeably due to the one-to-one correspondence between an object and its bounding box having the object located therein.

In summary, the scheduler 120 coordinates the performance of different functions by the object detection module 140, the pose tracking module 160, and the re-identification module 180. The object detection module 140 includes a CNN or any other neural network, the input is a keyframe or a specific non-keyframe, and the output are detected objects with bounding boxes. The pose tracking module 160 has a CNN to recurrently tracking an object. The pose tracking module 160 is a single person tracking module, and may respectively operate on different objects. The input is a detected bounding box or an inferred bounding box, and the output are keypoints of the bounding box deduced from heatmaps. The inputted bounding box may be pre-processed to have a fixed size. The re-identification module 180 has a SGCN structure, the input is bounding boxes and keypoints for comparison, and the output are two pose feature vectors or specifically a distance between the two pose feature vectors, and a determination of whether the distance is small enough that the two objects defined by the bounding boxes and keypoints are the same object. During operation, the objects in the frames are stored in the memory 114, each stored entry may include: frame ID, object ID, coordinates of a bounding box, coordinates of keypoints in the bounding box, and confidence scores of the keypoints.

Kindly note most of the process described above is about one of the objects. When multiple objects are processed for each frame, the tracking process is similar for each of the objects. In certain embodiments, the tracking of each object is independently performed. In other embodiments, certain synchronization is performed. For example, the object state is defined as "tracked" if all the objects are tracked. That is, if the pose tracking application 118 lost track on anyone of the objects, a new object detection is performed to detect multiple objects from scratch.

Figure 7A:
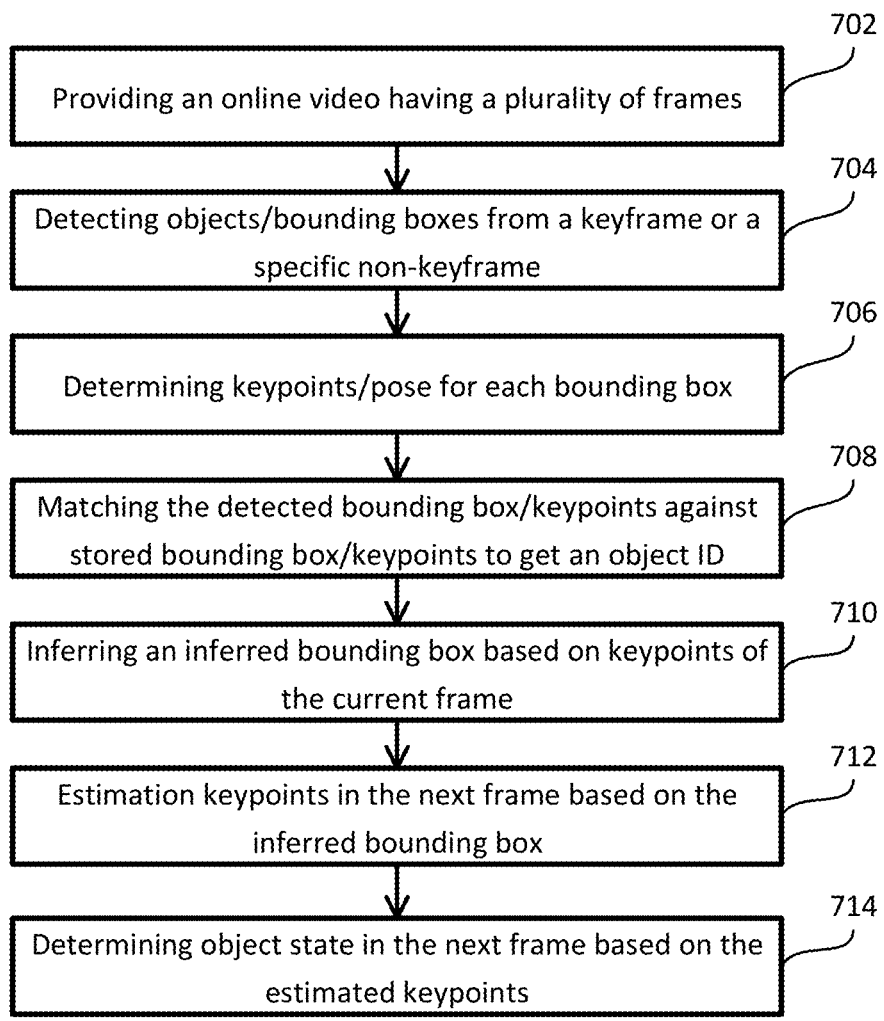
FIG. 7A schematically depicts a process of online human pose tracking on a keyframe or a specific non-keyframe according to certain embodiments of the disclosure.
Figure 7B:
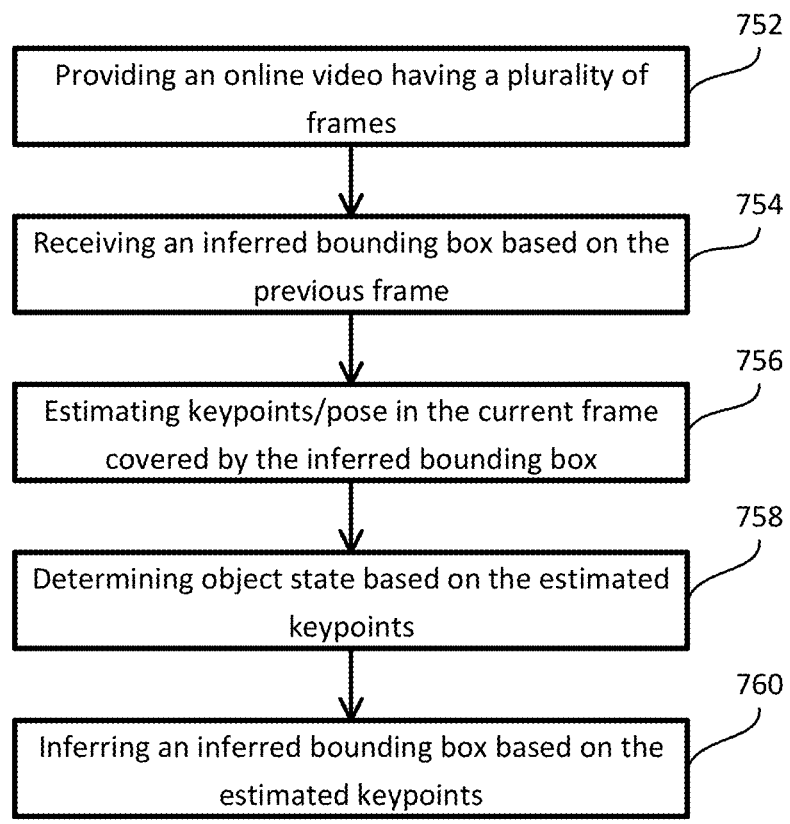
FIG. 7B schematically depicts a process of online human pose tracking on a non-keyframe according to certain embodiments of the disclosure.

FIG. 7A and FIG. 7B schematically depict an online top-down human pose tracking process according to certain embodiments of the present disclosure. In certain embodiments, the tracking process is performed by a computing device, such as the computing device 110 shown in FIG. 1, and specifically by the pose tracking application 118. The networks in the pose tracking application 118 are pre-trained before performing the process. In certain embodiments, the process shown in FIG. 7A and FIG. 7B is similar to or the same as the process shown in FIG. 6. It should be particularly noted that, unless otherwise stated in the present disclosure, the steps of the pose tracking process or method may be arranged in a different sequential order, and are thus not limited to the sequential order as shown in FIG. 7A and FIG. 7B.

After the pose tracking application 118 is well-trained, it is ready for pose tracking of multiple objects, especially under an online environment. In the following process, an i-th frame is a non-keyframe, and a j-th frame is a keyframe or a specific non-keyframe where the object state is "lost," where i and j are positive integers. FIG. 7A schematically shows a procedure for processing the j-th frame, and FIG. 7B schematically shows a procedure for processing the i-th frame.

As shown in FIG. 7A, at procedure 702, an online video is provided, which includes a plurality of sequential frames in sequential order, and the scheduler 120 loads the video to the memory 114 for processing. In the following steps, operations of the other modules, such as the object detection module 140, the pose tracking module 160 or its submodules, the re-identification module 180, are called by the scheduler 120. In certain embodiments, the operations may also not be called by the scheduler 120, but coded in those modules 140, 160 and 180.

At procedure 704, for the j-th frame of the video, which is a keyframe or a specific non-keyframe in which an object state is "lost," the object detection module 140 detects objects from the j-th frame, and defines a bounding box enclosing each of the detected objects. The objects is featured with the frame ID (such as j) and coordinates of the corresponding bounding box (such as 2D coordinates of two diagonal corner points).

At procedure 706, the pose estimation module 162 determines keypoints for each of the bounding box. Now each object is featured with frame ID and its bounding box coordinates, and the keypoints are featured with category ID and their coordinates. The category ID of the keypoints corresponds to parts of a human body, such as 15 keypoints corresponding to head, shoulder, elbow, wrist, waist, knee, ankle, etc. Each of the keypoints has a confidence score.

At procedure 708, the re-identification module 180 matches pose of the detected object (with bounding box/keypoints) to poses of stored objects (with bounding boxes/keypoints). When there is a match, the re-identification module 180 assigns the detected object an object ID the same as the object ID of the matched object. If there is no match, the re-identification module 180 assigns the detected object a new object ID. The detected object, now has the features of frame ID, object ID, keypoints, coordinates of the bounding box/keypoints, and keypoint confidence score, are stored in the memory 114 or other pre-defined storage location.

In certain embodiments, the poses of the detected object and the stored object are determined using a Siamese graph convolution network, for example as shown in FIG. 4 In certain embodiments, when the first frame is processed, there is no stored object information, and there is no need to perform the procedure 708. Instead, the object (with bounding box and keypoints) refined by the pose estimation module 162 is assigned with new object ID and are stored in the memory 114 for later use.

At procedure 710, the bounding box inference module 166 infers an inferred bounding box based on the keypoints in the current frame. In certain embodiments, the bounding box inference module 166 first define an enclosing bounding box using four of the keypoints that are the topmost, the lowest, the leftmost and the rightmost, and then enlarge the enclosing bounding box by 20% in both horizontal and vertical directions, expanding equally from both the left and right sides, and expanding equally from both the top and bottom sides.

At procedure 712, the pose estimation module 162 uses the inferred bounding box and the (j+1)-th frame to estimate keypoints in the (j+1)-th frame in the area covered by the inferred bounding box. The pose estimation module 162 output heatmaps for estimating keypoints, and each keypoint has a confidence score based on the heatmap.

At procedure 714, the object state module 164 calculates object state based on the confidence score of the estimated keypoints in the (j+1)-th frame. When the averaged confidence score is large, the object state is "tracked." This may indicate that the inferred bounding box and the estimated keypoints fit the image of the (j+1)-th frame, and the procedures 760-754-756-758 as described as follows are performed on the (j+1)-th frame. When the averaged confidence score is small, the object state is "lost." This may indicate that the inferred bounding box and the estimated keypoints do not fit the image of the (j+1)-th frame, and the procedures 704-714 are repeated on the (j+1)-th frame.

When the state is "tracked," the pose tracking application 118 may also store the detected objects (with bounding box and the keypoints) in the memory 114 for the j-th frame after the procedure 708.

As shown in FIG. 7B, at procedure 752, which is the same as the procedure 702 described above, the online video is provided.

At procedure 754, for the i-th frame of the video, which is a non-keyframe (in which an object state is determined as "tracked" later on), the pose estimation module 162 receives inferred bounding box based on the (i−1)-th frame.

At procedure 756, the pose estimation module 162 estimates keypoints based on the inferred bounding box and the i-th frame, and obtains estimated keypoints with confidence scores.

At procedure 758, the object state module 164 calculates object state in the i-th frame using the estimated keypoints. When the averaged confidence score is large, the object state is "tracked." This may indicate that the inferred bounding box and the estimated keypoints fit the image of the i-th frame, and the procedures 760-754-756-758 are then performed for the (i+1)-th frame. When the averaged confidence score is small, the object state is "lost." This may indicate that the inferred bounding box and the estimated keypoints do not fit the image of the i-th frame, and the procedures 704-714 are then performed on the i-th frame.

At procedure 760, the bounding box inference module 166 infers an inferred bounding box based on the estimated keypoints.

When the state is "tracked," the pose tracking application 118 may also store the inferred bounding box and the keypoints in the memory 114 for the i-th frame at procedure 758, or store the enclosing bounding box and the keypoints in the memory 114 for the i-th frame at procedure 760.

By the above operations described in FIG. 7A and FIG. 7B, the pose tracking application 118 is able to provide online tracking of objects in a video. The advantages of the present disclosure, among other things, include the overall model design, the re-identification of objects based on pose matching, the object state determination based on the current frame and the upcoming frame, and decision making based on the pose-matching and the object state. Because object detection is performed only on keyframes and specific non-keyframes, the performance of the application is more efficient. Further, the tracking is performed using keypoints based on enlarged regions, which is fast yet accurate. In addition, the present disclosure employ GCN to encode spatial relationship among human joints into a latent representation of human pose. The latent representation robustly encodes the pose, which is invariant to human location or view angle, and similarities of such encodings are then measured for matching of human poses.

In certain aspects, the present disclosure relates to a non-transitory computer readable medium storing computer executable code. In certain embodiments, the computer executable code may be the software stored in the storage device 116 as described above. The computer executable code, when being executed, may perform one of the methods described above.

In certain embodiments, the application 118 of the present disclosure provides a novel effective light-weight framework, which is also named LightTrack.

Experiments. Experiments have been conducted using the model according to certain embodiments of the present disclosure.

Experiments: 1. Dataset. PoseTrack is a large-scale benchmark for human pose estimation and articulated tracking in videos. It provides publicly available training and validation sets as well as an evaluation server for benchmarking on a held-out test set. The benchmark is a basis for the challenge competitions at ICCV'17 and ECCV'18 workshops. The dataset consisted of over 68,000 frames for the ICCV'17 challenge and is extended to twice as many frames for the ECCV'18 challenge. It now includes 593 training videos, 74 validation videos and 375 testing videos. For held-out test set, at most four submissions per task can be made for the same approach. Evaluation on validation set has no submission limit. Therefore, ablation studies described below are performed on the validation set. Since PoseTrack'18 test set is not open yet, we compare our results with other approaches in Experiment-performance comparison section on PoseTrack'17 test set. FIG. 8 shows pose pairs collected from PoseTrack'18 dataset in Table 1.

Experiments: 2. Evaluation Metrices. The evaluation includes pose estimation accuracy and pose tracking accuracy. Pose estimation accuracy is evaluated using the standard mAP metric, whereas the evaluation of pose tracking is according to the clear MOT metrics that are the standard for evaluation of multi-target tracking.

Experiments: 3. Implementation Details. We adopt state-of-the-art key-frame object detectors trained with ImageNet and COCO datasets. Specifically, we use pre-trained models from deformable ConvNets. We conduct experiments on validation sets to choose the object detector with better recall rates. For the object detectors, we compare the deformable convolution versions of the RFCN network and of the FPN network, both with ResNet101 backbone. The FPN feature extractor is attached to the Fast R-CNN head for detection. We compare the detection results with the ground truth based on the precision and recall rate on PoseTrack'17 validation set. In order to eliminate redundant candidates, we drop candidates with lower likelihood. As shown in FIG. 9 (Table 2), precision and recall of the detectors are given for various drop thresholds. Since the FPN network performs better, we choose it as our human candidate detector. During training, we infer ground truth bounding boxes of candidates from the annotated keypoints, because in PoseTrack'17 dataset, the bounding box positions are not provided in the annotations. Specifically, we locate a bounding box from the minimum and maximum coordinates of the 15 keypoints, and then enlarge this box by 20% both horizontally and vertically.

For the single-person human pose estimator, we adopt CPN101 and MSRA152 with slight modifications. We first train the networks with the merged dataset of Pose-Track'17 and COCO for 260 epochs. Then we finetune the network solely on PoseTrack'17 for 40 epochs in order to mitigate the inaccurate regression on head and neck. For COCO, bottom-head and top-head positions are not given. We infer these keypoints by interpolation on the annotated keypoints. We find that by finetuning on the PoseTrack dataset, the prediction on head keypoints will be refined. During finetuning, we use the technique of online hard keypoint mining, only focusing on losses from the 7 hardest keypoints out of the total 15 keypoints. Pose inference is performed online with single thread.

For the pose matching module, we train a Siamese graph convolutional network with 2 GCN layers and 1 convolutional layer using contrastive loss. We take normalized keypoint coordinates as input; the output is a 128 dimensional feature vector. Following Yan (Yan, S et al., Spatial temporal graph convolutional networks for skeleton-based action recognition, AAAI, 2018), we use spatial configuration partitioning as the sampling method for graph convolution and use learnable edge importance weighting. To train the Siamese network, we generate training data from the Pose-Track dataset. Specifically, we extract people with same IDs within adjacent frames as positive pairs, and extract people with different IDs within the same frame and across frames as negative pairs. Hard negative pairs only include spatially overlapped poses. The number of collected pairs are illustrated in FIG. 8 (Table 1). We train the model with batch size of 32 for a total of 200 epochs with SGD optimizer. Initial learning rate is set to 0:001 and is decayed by 0:1 at epochs of 40, 60, 80, 100. Weight decay is $10^{-4}$.

Experiments: 4. Ablation Study. We conducted a series of ablation studies to analyze the contribution of each component on the overall performance.

FIG. 9, Table 2 shows comparison of detectors: Precision-Recall on PoseTrack 2017 validation set. A bounding box is correct it its IoU with GT is above certain threshold, which is set to 0.4 for all experiments. FIG. 10, Table 3 shows comparison of offline pose tracking results using various detectors on PoseTrack'17 validation set. FIG. 11, Table 4 shows comparison of offline and online pose tracking results with various keyframe intervals on PoseTrack'18 validation set. FIG. 12, Table 5 shows performance comparison of LightTrack with GCN and SC on PoseTrack'18 validation set.

Detectors: We experimented with several detectors and decide to use Deformable ConvNets with ResNet101 as backbone, Feature Pyramid Networks (FPN) for feature extraction, and fast R-CNN scheme as detection head. As shown in Table 2, this detector performs better than Deformable R-FCN with the same backbone. It is no surprise that the better detector results in better performances on both pose estimation and pose tracking, as shown in FIG. 10, Table 3.

Offline vs. Online: We studied the effect of keyframe intervals of our online method and compare with the offline method. For fair comparison, we use identical human candidate detector and pose estimator for both methods. For offline method, we pre-compute human candidate detection and estimate the pose for each candidate, then we adopt a flow-based pose tracker, where pose flows are built by associating poses that indicate the same person across frames. For online method, we perform truly online pose tracking. Since human candidate detection is performed only at key frames, the online performance varies with different intervals. In Table 4, we illustrate the performance of the offline method, compared with the online method that is given various keyframe intervals. Offline methods performed better than online methods. But we can see the great potential of online methods when the detections (DET) at keyframes are more accurate, the upper-limited of which is achieved with ground truth (GT) detections. As expected, frequent keyframe helps more with the performance. Note that the online methods only use spatial consistency for data association at key frames. We report ablation experiments on the pose matching module in the following text. GCN vs. Spatial Consistency (SC): Next, we report results when pose matching is performed during data association stage, compared with only employing spatial consistency. It can be shown in Table 5 that the tracking performance increases with GCN-based pose matching. However, in some situations, different people may have near-duplicate poses. To mitigate such ambiguities, spatial consistency is considered prior to pose similarity.

GCN vs. Euclidean Distance (ED): We studied whether the GCN network outperforms naive pose matching scheme. With same normalization on the keypoints, ED as the dissimilarity metric for pose matching renders 85% accuracy on validation pairs generated from PoseTrack dataset, while GCN renders 92% accuracy. We validate on positive pairs and hard negative pairs.

Experiments: 5. Performance Comparison. FIG. 13, Table 6 shows performance comparison on PoseTrack dataset. The last column shows the speed in frames per second (* means excluding pose inference time). For our online methods, mAP are provided after keypoints dropping. For our offline methods, mAP are provided both before (left) and after (right) keypoints dropping.

Since PoseTrack'18 test set is not open yet, we compare our methods with other approaches, both online and offline, on PoseTrack'17 test set. For fair comparison, we only use PoseTrack'17 training set and COCO train+val set to train the pose estimators. No auxiliary data is used. We performed ablation studies on validation sets with CPN-101 as the pose estimator. During testing, in addition to CPN-101, we conduct experiments using MSRA-152.

Accuracy: As shown in Table 6, our method LightTrack outperforms other online methods while maintaining a much higher frame rate, and is very competitive with offline state-of-the-arts. For our offline approach, we use the same detector and pose estimator of LightTrack, except we replace LightTrack with the official release of PoseFlow for performance comparison. Although the PoseFlow algorithm is conceptually online, the processing is performed in multiple stages, and requires keypoint-matching between frames pre-computed, which is computationally expensive. In contrast, our LightTrack is truly processed online.

Speed: Testing on single Telsa P40 GPU, pose matching costs an average of 2:9 ms for each pair. Since pose matching only occurs at key-frames, its frequency of occurrence depends on the number of candidates and length of keyframe intervals. Therefore, we test the average processing time on the PoseTrack'18 validation set, which consists of 74 videos with a total of 8,857 frames. It takes the online algorithm CPN101-LightTrack 11, 638 seconds to process, of which 11, 450 secs used for pose estimation. The frame rate of the whole system is 0:76 fps. The framework runs at around 47.11 fps excluding pose inference time. In total, 57,928 persons are encountered. An average of 6.54 people are tracked for each frame. It takes CPN101 140 ms to process each human candidate, including 109 ms pose inference and 31 ms for pre-processing and postprocessing. There is potential room for the actual frame rate and tracking performance to improve with other choices of pose estimators and parallel inference optimization. We see an improved performance with MSRA152-LightTrack but slightly slower frame rate due to its 133 ms inference time.

Experiments: 6. Discussions.

Accuracy: Since the components in our framework are easily replaceable and extendable, methods employing this framework can potentially become faster, more accurate, or possibly both. Note that the pose estimator mentioned in section 3 can be replaced by a more accurate or a much faster counterpart. The performance boost in the general object detector, or methods that focus on detecting people (e.g., using auxiliary dataset), should also improve the pose tracking performance. Ablation study in section 4 has shown that better detection increases the MOTA score, regardless of which detectors to use.

Speed: The pose estimation network can be prioritized for speed while sacrificing some accuracy. For instance, we use YOLOv3 and MobileNetv1-deconv (YoloMD) as detector and pose estimator, respectively. It achieves an average of 2 FPS with 70.4 mAP and MOTA score 55.7% on PoseTrack'18 validation set. Aside from network structure design, a faster network could also refine heatmaps from previous frame(s). Recently, refinement-based networks have drawn enormous attention.

Flexibility: The advantage of our top-down approach in pose tracking is that we can conveniently track specific targets and do not necessarily track all candidates. It can be achieved simply by choosing the target(s) at the first frame and providing target locations at key-frames. As a side effect, this further reduces computational complexity. If the target has specific visual appearance, the framework can be conveniently extended to ensure only the target can be matched at key-frames and tracked at remaining frames.

In summary, the present disclosure provides an effective and generic lightweight framework for online human pose tracking. The present disclosure also provides a baseline employing this framework, and provides a Siamese graph convolution network for human pose matching as a Re-ID module in our pose tracking system. The skeleton-based representation effectively captures human pose similarity and is computationally inexpensive. The method of the disclosure outperforms other online methods significantly, and is very competitive with offline state-of-the-arts but with much higher frame rate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES (INCORPORATED HEREIN BY REFERENCE IN THEIR ENTIRETIES)

1. LAW, H and DENG, J, CornerNet: Detecting objects as paired keypoints, 2019, arXiv:1808.01244.
2. XIAO, B; WU, H and WEI, Y, Simple baselines for human pose estimation and tracking, 2018, arXiv: 1804.06208.
3. YAN, S; XIONG, Y; and LIN D, Spatial temporal graph convolutional networks for skeleton-based action recognition, 2018, arXiv:1801.07455.
4. ZHU, J; YANG, H, et al., Online multi-object tracking with dual matching attention networks, 2019, arXiv: 1902.00749.

What is claimed is:
1. A system for pose tracking, comprising:
a computing device, comprising a processor and a storage device storing computer executable code, wherein the computer executable code, when executed at the processor, is configured to:

provide a plurality of sequential frames of a video, the sequential frames comprising at least one keyframe and a plurality of non-keyframes;

for each of the non-keyframes:

receive a previous inference bounding box of an object inferred from a previous frame;

estimate keypoints from the non-keyframe in an area defined by the previous inference bounding box to obtain estimated keypoints;

determine object state based on the estimated keypoints, wherein the object state comprises a "tracked" state and a "lost" state;

when the object state is "tracked," infer an inference bounding box based on the estimated keypoints to process a frame next to the non-keyframe, comprising: determine an enclosing bounding box based on topmost, lowest, left most, and right most keypoints among the estimated keypoints, and enlarge the enclosing bounding box so as to obtain the inference bounding box; and when the object state is "lost":

detect objects from the non-keyframe, wherein each of the detected objects is defined by a detected bounding box;

estimate keypoints of each detected object from corresponding one of the detected bounding box to obtain detected keypoints, identify each of the detected objects by comparing the detected keypoints of the detected object against stored keypoints of stored objects, each of the stored objects has an object identification (ID); and assign the detected object with the object ID of one of the stored objects when the detected keypoints match the stored keypoints from corresponding one of the stored objects, and assign the object with a new object ID when the estimated keypoints of the object do not match the keypoints of anyone of the stored objects.

2. The system of claim 1, wherein the computer executable code is configured to estimate keypoints from the non-keyframe using a convolutional neural network.

3. The system of claim 1, wherein the object state is "tracked" when the estimated keypoints have an average confidence score greater than a threshold score, and the object state is "lost" when the estimated keypoints have the average confidence score equals to or less than the threshold score.

4. The system of claim 1, wherein the computer executable code is configured to infer the inference bounding box by:

enlarging the enclosing bounding box by 20% along each of a horizontal direction and a vertical direction of the enclosing box.

5. The system of claim 1, wherein the computer executable code is configured to detect objects using a convolutional neural network.

6. The system of claim 1, wherein the computer executable code is configured to estimate the keypoints using a convolutional neural network.

7. The system of claim 1, wherein the step of comparing the detected keypoints of the detected object against the stored keypoints is performed using a Siamese graphic convolutional network (SGCN), the SGCN comprises two graph convolutional networks (GCNs) with shared network weight, each of the GCNs comprise:

a first graphic convolutional network (GCN) layer;
a first Relu Unit connected to the first GCN layer;

a second GCN layer connected to the first Relu Unit;
a second Relu Unit connected to the second GCN layer;
an average pooling layer connected to the second GCN layer;
a fully connected network (FCN); and
a feature vector converting layer,
wherein the first GCN layer is configured to receive detected keypoints of one of the detected objects, and the feature vector converting layer is configured to produce a feature vector representing pose of one of the detected objects.

8. The system of claim 7, wherein the SGCN is configured to perform the step of comparing by:

running estimated keypoints through one of the two GCNs to obtain an estimated feature vector for the estimated keypoints;

running stored keypoints of one of the stored objects through the other one of the two GCNs to obtain a feature vector for the stored keypoints; and determining the estimated keypoints and the stored keypoints as match when the estimated feature vector and the stored feature vector has a distance less than a predetermined threshold.

9. The system of claim 1, wherein for each of the keyframes, the computer executable code is configured to:

detect objects in the keyframe, wherein each of the detected objects is defined by a bounding box;

estimate a plurality of detected keypoints of each of the detected objects from the bounding box corresponding to the detected object;

identify each of the detected objects by comparing the detected keypoints of the detected object against stored keypoints of each stored object, each of the stored objects having an object ID; and assign the detected object with the detected keypoints with the object ID from one of the stored objects when the detected keypoints match the stored keypoints from the one of the stored objects.

10. The system of claim 9, wherein for each of the keyframes, the computer executable code is configured to, when the estimated keypoints of the object do not match the keypoints of anyone of the stored objects: assign the object with a new object ID.

11. A method for pose tracking, comprising:

providing a plurality of sequential frames of a video, the sequential frames comprising at least one keyframe and a plurality of non-keyframes;

for each of the non-keyframes:

receiving a previous inference bounding box of an object inferred from a previous frame;

estimating keypoints from the non-keyframe in an area defined by the previous inference bounding box to obtain estimated keypoints;

determining object sate based on the estimated keypoints, wherein the object state comprises a "tracked" state and a "lost" state;

when the object state is "tracked," inferring an inference bounding box based on the estimated keypoints to process a frame next to the non-keyframe, comprising: determining an enclosing bounding box based on topmost, lowest, left most, and right most keypoints among the estimated keypoints, and enlarging the enclosing bounding box so as to obtain the inference bounding box; and when the object state is "lost":

detecting objects from the non-keyframe, wherein each of the detected objects is defined by a detected bounding box;

estimating keypoints of each detected object from corresponding one of the detected bounding boxes to obtain detected keypoints;

identifying each detected object by comparing the detected keypoints of the detected object against stored keypoints of each of stored objects, each of the stored objects has an object identification (ID); and assigning the detected object with the object ID of one of the stored object when the detected keypoints match the stored keypoints of the one of the stored objects, and assigning the object with a new object ID when the estimated keypoints of the object do not match the keypoints of anyone of the stored objects.

12. The method of claim 11, wherein the object state is "tracked" when the estimated keypoints have an average confidence score greater than a threshold score, and the object state is "lost" when the estimated keypoints have the confidence score equals to or less than the threshold score.

13. The method of claim 11, wherein the step of inferring the inference bounding box comprises:

enlarging the enclosing bounding box by 20% along each of a horizontal direction and a vertical direction of the enclosing box.

14. The method of claim 11, wherein each of the step of detecting objects and the step of estimating keypoints is performed using a convolutional neural network (CNN).

15. The method of claim 11, wherein the step of comparing the detected keypoints of the detected objects against the store keypoints is performed using a Siamese graphic convolutional network (SGCN), the SGCN comprises two graph convolutional networks (GCNs) with shared network weight, each of the GCNs comprise:

a first graphic convolutional network (GCN) layer;
a first Relu Unit connected to the first GCN layer;
a second GCN layer connected to the first Relu Unit;
a second Relu Unit connected to the second GCN layer;
an average pooling layer connected to the second GCN layer;
a fully connected network (FCN); and
a feature vector converting layer,
wherein the first GCN layer is configured to receive detected keypoints of one of the detected objects, and the feature vector converting layer is configured to produce a feature vector representing pose of the one of the detected objects.

16. The method of claim 11, further comprising, for each of the keyframes:

detecting objects from the keyframe, wherein each of the detected objects is defined by a detected bounding box;
estimating detected keypoints from each of the detected bounding box to obtain detected keypoints;

identifying each of the detected objects by comparing the detected keypoints of the detected objects against stored keypoints of each of stored objects, each of the stored objects having an object identification (ID); and assigning the detected object with the object ID of one of the stored objects when the detected keypoints match the stored keypoints of the one of the stored objects.

17. A non-transitory computer readable medium storing computer executable code, wherein the computer executable code, when executed at a processor of a computing device, is configured to:

provide a plurality of sequential frames of a video, the sequential frames comprising at least one keyframe and a plurality of non-keyframes;

for each of the non-keyframes:

receive a previous inference bounding box of an object inferred from a previous frame;

estimate keypoints from the non-keyframe in an area defined by the previous inference bounding box to obtain estimated keypoints;

determine object state based on the estimated keypoints, wherein the object state comprise a "tracked" state and a "lost" state; and when the object state is "tracked," infer an inference bounding box based on the estimated keypoints to process a frame next to the non-keyframe, comprising: determine an enclosing bounding box based on topmost, lowest, left most, and right most keypoints among the estimated keypoints, and enlarge the enclosing bounding box so as to obtain the inference bounding box; and when the object state is "lost":

detect objects from the non-keyframe, wherein each of the detected objects is defined by a detected bounding box;

estimate keypoints of each detected object from corresponding one of the detected bounding box to obtain detected keypoints;

identify each of the detected objects by comparing the detected keypoints of the detected object against stored keypoints of stored objects, each of the stored objects has an object identification (ID); and assign the detected object with the object ID of one of the stored objects when the detected keypoints match the stored keypoints from corresponding one of the stored objects, and assign the object with a new object ID when the estimated keypoints of the object do not match the keypoints of anyone of the stored objects.

* * * * *